(12) United States Patent
Nomura et al.

(10) Patent No.: US 7,829,237 B2
(45) Date of Patent: Nov. 9, 2010

(54) PROTON CONDUCTIVE FILM, METHOD FOR PRODUCING THE SAME, AND FUEL CELL USING SAME

(75) Inventors: Shigeki Nomura, Ibaraki (JP); Toshihito Miyama, Ibaraki (JP)

(73) Assignee: Sekisui Chemical Co., Ltd., Osaka (JP)

( * ) Notice: Subject to any disclaimer, the term of this patent is extended or adjusted under 35 U.S.C. 154(b) by 1364 days.

(21) Appl. No.: 10/559,082

(22) PCT Filed: Jun. 10, 2004

(86) PCT No.: PCT/JP2004/008487

§ 371 (c)(1),
(2), (4) Date: Dec. 2, 2005

(87) PCT Pub. No.: WO2004/112177

PCT Pub. Date: Dec. 23, 2004

(65) Prior Publication Data

US 2006/0141313 A1 Jun. 29, 2006

(30) Foreign Application Priority Data

Jun. 13, 2003 (JP) .......................... P2003-169848

(51) Int. Cl.
*H01M 6/14* (2006.01)
*H01M 6/18* (2006.01)
*C08G 77/22* (2006.01)
*C08G 77/60* (2006.01)

(52) U.S. Cl. .................. 429/498; 429/532; 528/30; 528/35

(58) Field of Classification Search .................. 429/303, 429/313, 317, 44, 30, 33, 42, 34, 41, 46; 528/30, 35
See application file for complete search history.

(56) References Cited

U.S. PATENT DOCUMENTS 3,282,875 A 11/1966 Connolly et al.

(Continued)

FOREIGN PATENT DOCUMENTS

CA 2 433 320 10/2008

(Continued)

OTHER PUBLICATIONS

"The Morphology in Nafion . . ." Journal of Polymer Science, Polymer Physics Edition, vol. 19, 1687-1704 (1981) Membrane, vol. 28, No. 1, 1-44 (2003).

(Continued)

*Primary Examiner*—Jennifer K. Michener
*Assistant Examiner*—Eli S Mekhlin
(74) *Attorney, Agent, or Firm*—Greenblum & Bernstein, P.L.C.

(57) ABSTRACT

An object of the present invention is to solve the problems with conventional polymer electrolyte fuel cells and provide a proton conducting membrane which exhibits an excellent heat resistance and an excellent protonic conductivity and a high dimensional stability even at high temperatures, a method for producing the same and a fuel cell using the same.

The proton conducting membrane of the present invention is a proton conducting membrane having particles 1 comprising a metal-oxygen crosslinked structure and the particles 1 have an acid group such as sulfonic acid group incorporated in the surface thereof and form a continuity. The gap 2 between the particles is communicated from the main surface to the opposite surface of the proton conducting membrane to form a proton conducting channel.

27 Claims, 3 Drawing Sheets

U.S. PATENT DOCUMENTS

| | | | |
|---|---|---|---|
| 5,679,482 A * | 10/1997 | Ehrenberg et al. | 429/249 |
| 6,242,135 B1 | 6/2001 | Mushiake | |
| 6,680,138 B1 | 1/2004 | Honma et al. | |
| 7,214,756 B2 * | 5/2007 | Nomura et al. | 528/30 |
| 2004/0053113 A1 | 3/2004 | Nishikawa et al. | |
| 2004/0062970 A1 | 4/2004 | Nomura et al. | |
| 2007/0213495 A1 | 9/2007 | Nomura et al. | |

FOREIGN PATENT DOCUMENTS

| | | |
|---|---|---|
| EP | 1085038 | 3/2001 |
| EP | 1427043 | 6/2004 |
| EP | 1441365 | 7/2004 |
| JP | A-4-366137 | 12/1992 |
| JP | 6-394 | 1/1994 |
| JP | A-6-342665 | 12/1994 |
| JP | A-8-249923 | 9/1996 |
| JP | A-9-87510 | 3/1997 |
| JP | A-9-110982 | 4/1997 |
| JP | A-10-21943 | 1/1998 |
| JP | A-10-45913 | 2/1998 |
| JP | A-10-69817 | 3/1998 |
| JP | 2001-11219 | 1/2001 |
| JP | 2003-331644 | 11/2003 |
| WO | WO 02-37506 | 5/2002 |
| WO | 03026051 | 3/2003 |
| WO | WO 03041091 A1 * | 5/2003 |

OTHER PUBLICATIONS

"Proton-Conducting Silica-Gel Films . . ." Solid State Ionics, 74, 105-108 (1994).

Form PCT/ISA/210 (International Search Report) for PCT/JP2004/008487.

Canadian Patent Office Action dated Sep. 3, 2008.

Office Action for corresponding Canadian Application No. 2,525,233.

European Search Report dated Nov. 30, 2009 that issued with respect to patent family member EP 04746015.9.

* cited by examiner

PROTON CONDUCTIVE FILM, METHOD FOR PRODUCING THE SAME, AND FUEL CELL USING SAME

TECHNICAL FIELD

The present invention relates to a proton conducting membrane, a method for producing the same and a fuel cell using the same and more particularly to a proton conducting membrane which is excellent in heat resistance, dimensional stability, fuel barrier properties, etc. and exhibits an excellent protonic conductivity even at high temperatures, a method for producing the same and a fuel cell which can cope with high temperature operation or direct supply of fuel such as methanol by using the same.

BACKGROUND ART

A fuel cell has been noted as a next-generation electricity-generating device which can contribute to the solution to environmental issue and energy issue, which have been recently socially great problems, because it exhibits a high electricity generating efficiency and excellent environmental properties.

Fuel cells are normally divided into several types by the kind of electrolyte, and among these types, the polymer electrolyte fuel cell (hereinafter occasionally referred to as "PEFC") has a small size and a high output as compared with any other types of fuel cells and has been regarded as a next-generation mainstream of electric supply such as small-scale on-site electric supply, electric supply for mobile body such as power source for vehicle and electric supply for portable devices.

Thus, PEFC has excellent advantages in principle and has been extensively developed for practical use. This PEFC normally uses hydrogen as a fuel. Hydrogen decomposes proton (hydrogen ion) and electron in the presence of a catalyst disposed on the anode side of PEFC. Among these components, the electron is supplied to the exterior where it is then used as electricity and then circulated to the cathode side of PEFC. On the other hand, the proton is supplied to a proton conducting membrane (electrolyte membrane) through which it moves to the cathode side. On the cathode side, the proton, the electron which has been circulated and oxygen which has been introduced from the exterior are combined in the presence of a catalyst to produce water. In other words, as viewed singly, PEFC is a very clean energy source which allows electricity to be drawn when water is produced from hydrogen and oxygen.

As the fuel for fuel cell there is normally used hydrogen, but a fuel cell which directly introduces a fuel other than hydrogen such as alcohol, ether and hydrocarbon thereinto so that proton and electron are drawn from such a fuel in the presence of a catalyst has been extensively studied. A representative example of such a fuel cell is a direct methanol fuel cell (hereinafter occasionally referred to as "DMFC") which uses methanol (normally in the form of aqueous solution) as a fuel.

Herein, the proton conducting membrane acts to transmit proton produced on the anode to the cathode side. As mentioned above, the movement of proton occurs in cooperation with the flow of electron. In other words, in order that PEFC might give a high output, i.e., high current density, it is necessary that protonic conduction be conducted at a high rate in a sufficient amount. Accordingly, it is no exaggeration to say that the performance of the proton conducting membrane is a key material that determines the performance of PEFC. Further, the proton conducting membrane acts to not only conduct proton but also play a role as an insulating membrane that electrically insulates the anode off the cathode and a fuel barrier membrane that prevents the fuel supplied to the anode side from leaking to the cathode side.

The main proton conducting membrane which is now used in PEFC is a fluororesin-based membrane comprising a perfluoroalkylene as a main chain and partly having a sulfonic acid group at the end of perfluorovinylether side chain. As such sulfonated fluororesin-based membranes there are known, e.g., Nafion (trade name) membrane (Du Pont Inc.; see Patent Reference 1), Dow membrane (Dow Chemical Inc.; see Patent Reference 2), Aciplex (trade name) membrane (Asahi Kasei Corporation; see Patent Reference 3), Flemion (trade name) membrane (ASAHI GLASS COMPANY), etc.

It is said that these fluororesin-based membranes have a glass transition temperature (Tg) in the vicinity of 130° C. under wet conditions where fuel cells are used, and in the vicinity of this temperature, so-called creep occurs, resulting in the change of the structure of the proton conducting membrane in the membrane and hence making it impossible for the proton conducting membrane to exhibit a stable protonic conductivity. Further, the member degenerates to swollen state and becomes a jelly-like material that can easily be destroyed to cause failure in the fuel cell.

For the aforementioned reasons, the maximum temperature of present use at which the fuel cell can be stably used over an extended period of time is normally regarded as 80° C.

In its principle, a fuel cell uses chemical reaction and thus exhibits a higher energy efficiency when operated at high temperatures. In other words, as viewed on the basis of the same output, a device which can be operated at high temperatures can be reduced more in size and weight. Further, when the fuel cell is operated at high temperatures, its exhaust heat, too, can be utilized, allowing so-called cogeneration (combined supply of heat and electricity) that drastically enhances the total energy efficiency. Accordingly, it is considered that the operating temperature of a fuel cell is somewhat higher, normally 100° C. or more, particularly preferably 120° C. or more.

Further, in the case where hydrogen which has not been thoroughly purified is supplied into a fuel cell, a phenomenon that the catalyst used on the anode side can be deactivated by impurities (e.g., carbon monoxide) in the fuel, i.e., so-called catalyst poisoning occurs, raising a great problem that governs the life of PEFC. It is known that this catalyst poisoning, too, can be avoided when the fuel cell can be operated at high temperatures, and in this respect, too, it is preferred that the fuel cell be operated at higher temperatures. Further, when the fuel cell can be operated at higher temperatures, there is no necessity of using a purified product of noble metal such as platinum, which has heretofore been used, as the catalyst, making it possible to use an alloy of various metals to great advantage from the standpoint of cost or resources.

On the other hand, direct fuel type fuel cells which operate by using directly a fuel other than hydrogen such as DMFC are now under studies of efficient extraction of proton and electron from the fuel, but the enhancement of fuel barrier properties of the proton conducting membrane and the high temperature operation for efficient action of catalyst are considered technical assignments to be solved to obtain a sufficient output.

Thus, although it is considered desirable from various standpoints of view that PEFC be operated at higher temperatures, the heat resistance of the proton conducting membrane is up to 80° C. as previously mentioned and the operating temperature of the fuel cell, too, is thus limited to 80° C. at present.

By the way, the reaction occurring during the operation of the fuel cell is an exothermic reaction, and when the fuel cell is operated, the temperature in PEFC then spontaneously rises. However, since Nafion, which is a representative proton conducting membrane of present use, has so heat-resistant as to withstand 80° C. at highest, it is necessary that PEFC be cooled so that the temperature thereof doesn't rise to 80° C. or more. Cooling is normally accomplished by water cooling, and PEFC is devised at the separator portion thereof for cooling. When provided with such cooling means, PEFC is large-sized and heavy as a whole, making it impossible to make sufficient use of small size and light weight, which are inherent characteristics of PEFC. In particular, when the critical operating temperature is 80° C., effective cooling is made difficult in the water cooling system, which is the simplest cooling means. When operation can be made at 100° C. or more, the heat can be utilized to evaporate water, making effective cooling, and the circulation of water makes it possible to drastically reduce the amount of water to be used during cooling and hence attain the reduction of size and weight of the device. Since the comparison of temperature control at 100° C. or more with temperature control at 80° C. in the case where the fuel cell is used as an energy source for vehicle shows that the capacity of radiator and cooling water can be drastically reduced, PEFC which can be operated 100° C. or more, i.e., proton conducting membrane having a heat resistance to 100° C. or more has been keenly desired.

Although PEFC has been required to operate at high temperatures, that is, proton conducting membranes are required to have high temperature resistance from various standpoints of view such as electricity generating efficiency, cogeneration efficiency, cost, resources and cooling efficiency, no proton conducting membranes having both sufficient protonic conductivity and heat resistance exist.

Under these circumstances, in order to raise the operating temperature of PEFC, various heat-resistant proton conducting materials have been studied and proposed to date.

A representative example of these heat-resistant proton conducting materials is a heat-resistant aromatic polymer material that substitutes for the conventional fluorine-based membranes, and examples of such a heat-resistant aromatic polymer material include polybenzimidazoles (see Patent Reference 4), polyethersulfones (see Patent References 5, 6), polyether ether ketones (see Patent Reference 7), etc.

These aromatic polymer materials are advantageous in that they undergo little structural change at high temperatures, but on the other hand, most of them have sulfonic acid groups, carboxylic acid groups, etc. incorporated directly in the aromatic group, and in this case, they can undergo remarkable desulfonation or decarbonation at high temperatures and thus are not suitable for high temperature-working membrane.

Further, when water exists and at high temperatures, the entire membrane tends to swell remarkably as the fluororesin-based membrane does, and due to the change of the size of the membrane, stress is applied to the junction of the membrane-electrode assembly, making it very likely that the membrane and the electrode can be exfoliated at the junction or the membrane can be broken, and there rises a problem that the reduction of strength of the membrane due to swelling can cause membrane destruction. Further, since all these aromatic polymer material are polymer compounds which stay rigid when dried, there rises a problem that the membrane can undergo destruction or the like during the formation of membrane-electrode assembly.

In order to solve these problems, a method has been studied which comprises incorporating these electrolytes in a porous resin (see Patent Reference 8). In this case, membrane strength and dimensional stability can be greatly improved, but the proton conducting material used is similar to the conventional materials and leaves something to be desired in essential thermal stability.

On the other hand, the following inorganic materials have been proposed as proton conducting material. For example, Minami et al obtained proton conducting materials by adding various acids to hydrolyzable silyl compounds (see Nonpatent Reference 1). These inorganic materials are stable even at high temperatures but are disadvantageous in that these acids are scattered and lost to lower the conductivity after prolonged use because there are present many acids which are not connected to crosslinking groups.

In order to overcome these problems, a method which comprises grinding a proton conducting inorganic material, and then mixing the material thus ground with an elastomer (see Patent Reference 9), a method which comprises mixing the material thus ground with a sulfonic acid group-containing polymer (see Patent Reference 10), etc. for example have been attempted, but since these methods only involve the mixing of a polymer material as a binder with an inorganic crosslinked material, the mixture has no great difference in basic thermal properties from polymer material alone and thus undergoes structural change of polymer material at high temperatures and doesn't exhibit stable protonic conductivity and high protonic conductivity in many cases.

Although various electrolyte membrane materials have been researched and developed to eliminate the problems with the conventional polymer electrolyte fuel cells as mentioned above, no proton conducting membranes having sufficient durability at high temperatures (e.g., 100° C. or more) and satisfying various desired physical properties such as mechanical strength have ever existed to date.

On the other hand, in DMFC, which uses methanol as a fuel instead of hydrogen, methanol is brought into direct contact with the membrane. Sulfonated fluororesin-based membranes which are used at present exhibit a high affinity for methanol, and when the membrane absorbs methanol, it extremely swells and, in some cases, dissolves, causing failure in the fuel cell.

For example, Nafion membrane, which is a representative example of fluororesin membranes, is a flexible membrane which is rigid when dried but swells great when wet. Thus, when the dimension of the membrane greatly differs from when dried to when wet, MEA can be difficultly produced and the membrane always undergoes elongation/shrinkage with the change of temperature and humidity in the fuel cell caused by the change of operating conditions even during the operation of the fuel cell, making it likely that the breakage of the membrane or the destruction of MEA can occur. Further, when swollen, the membrane becomes weakened, there arises a risk of not only the aforementioned dimensional change but also membrane breakage in the case of occurrence of pressure difference in the fuel cell.

Further, when this fluororesin membrane is exposed to a temperature as high as, e.g., 150° C. while being wet over an extended period of time, the membrane itself collapses in the form of jelly and thus can no longer be used as a proton conducting membrane for fuel cell. Further, even when exposed to a temperature of about 120° C., the fluororesin membrane undergoes creep that leads to degeneration to swollen state. Once degenerated, the fluororesin membrane becomes hard and brittle when dried due to the change of operating conditions of fuel cell, making it likely that the breakage or cracking of the membrane and even the destruction of MEA can occur. This similarly occurs with membranes having an aromatic molecular structure in its main chain.

Further, methanol leaks to the oxygen electrode side, causing drastic drop of the output of the fuel cell. This a problem that occurs also with an electrolyte membrane containing an aromatic ring. Therefore, no efficient and durable membranes exist at present also for DMFC.

The aforementioned Nafion membrane, which is now used as a proton conducting membrane on a standard basis, has a polytetra(or tri)fluoroethylne in its main chain and a sulfonic acid group in its side chains. Since the polytetra(or tri)fluoroethylne is nonpolar and water-repellent and the sulfonic acid group in the side chains is polar and hydrophilic, a phase-separated structure is spontaneously formed, resulting in the formation of a structure in which a sulfonic acid group is accumulated in a high concentration, which structure acting as a proton conducting channel (see Non-patent Reference 2).

On the other hand, most of the aromatic hydrocarbon-based membranes which are now under studies as heat-resistant membrane have such a phase structure (see Non-patent Reference 3). As a result, a high conductivity cannot be obtained unless a large amount of acid is uniformly present in the membrane, but the incorporation of a large amount of acid occasionally causes the membrane to have deteriorated water resistance that renders the membrane soluble in water or highly swellable at high temperatures.

(Patent Reference 1) U.S. Pat. No. 3,282,875
(Patent Reference 2) JP-A-4-366137
(Patent Reference 3) JP-A-6-342665
(Patent Reference 4) JP-A-9-110982
(Patent Reference 5) JP-A-10-21943
(Patent Reference 6) JP-A-10-45913
(Patent Reference 7) JP-A-9-87510
(Patent Reference 8) U.S. Pat. No. 6,242,135
(Patent Reference 9) JP-A-8-249923
(Patent Reference 10) JP-A-10-69817
(Non-patent Reference 1) Solid State Ionics, vol. 74, page 105, 1994
(Non-patent Reference 2) Journal of Polymer Science, Polymer Physics, vol. 19, page 1,687, 1981
(Non-patent Reference 3) MEMBRANE, vol. 28, page 14, 2003

The present invention has been worked out in the light of the aforementioned circumstances and an object of the present invention is solve the problems with conventional polymer electrolyte fuel cells and provide a proton conducting membrane which exhibits an excellent protonic conductivity and a high heat resistance and dimensional stability even at high temperatures, a method for producing the same and a fuel cell using the same.

Further, another object of the present invention is to provide a proton conducting membrane excellent in durability, fuel barrier properties, etc., a method for producing the same and a fuel cell which can cope with high temperature operation or direct supply of a fuel such as methanol by using the same.

DISCLOSURE OF THE INVENTION

The present inventors made extensive studies in the light of the aforementioned problems, and as a result, it was discovered that a proton conducting membrane having particles comprising a silicon-oxygen crosslinked structure wherein the particles have an acid group incorporated in the surface thereof and form a continuity can attain both a high protonic conductivity and a high heat resistance, and the present invention has been worked focusing on the discovery.

In other words, the proton conducting membrane of the present invention is a proton conducting membrane having particles comprising a crosslinked structure comprising metal-oxygen bond, wherein the crosslinked structure comprises a continuity of particles and the particles are provided with an acid group on the surface thereof and have a proton conducting channel formed in the gap therebetween.

Thus, the proton conducting membrane of the present invention has a skeleton comprising a continuity of particles, each of which is particulate, and thus is extremely rigid. Further, since the particles have a crosslinked structure comprising a metal-oxygen bond and form a continuity, the proton conducting membrane of the present invention can be provided with a prolonged stability and hence high heat resistance, durability and dimensional stability even when exposed to high temperature under strong acidic conditions. Further, the proton conducting membrane of the present invention can have a selected number of crosslinking groups incorporated therein to have a proper crosslink density that prevents the occurrence of a great change of dimension of membrane regardless of whether or not it is swollen. Accordingly, since the proton conducting membrane of the present invention undergoes neither elongation nor shrinkage due to the change of internal temperature and humidity in the fuel cell caused by the change of operating conditions also during the operation of the fuel cell, there occurs no break of the membrane or destruction of the membrane-electrode assembly (hereinafter occasionally referred to as "MEA").

Further, the method for producing a proton conducting membrane of the present invention comprises a first step of preparing a mixture comprising a mercapto group-containing compound (D) having a mercapto group and a condensation-reacting hydrolyzable silyl group covalently bonded to the mercapto group and/or silanol group and a polarity controller (E), a second step of film-forming the mixture, a third step of subjecting the hydrolyzable silyl group contained in the aforementioned mixture thus film-formed to hydrolysis and condensation and/or the silanol contained therein to condensation to form a film having a continuity of particles comprising the aforementioned silicon-oxygen crosslinked structure and a fourth step of oxidizing the mercapto group in the aforementioned film to a sulfonic acid group which is then introduced into the surface of the particles.

In this method, the crosslinking agent and the polarity controller and the added amount thereof at the first step can be adjusted to control the crosslink degree of the membrane thus obtained, the particle diameter, the gap between particles, etc., making it possible to fairly control the properties of the membrane, including membrane strength and degree of flexibility.

The fuel cell of the present invention is formed by clamping the aforementioned proton conducting membrane between a positive electrode (air electrode) and a negative electrode (fuel electrode).

Figure 1:
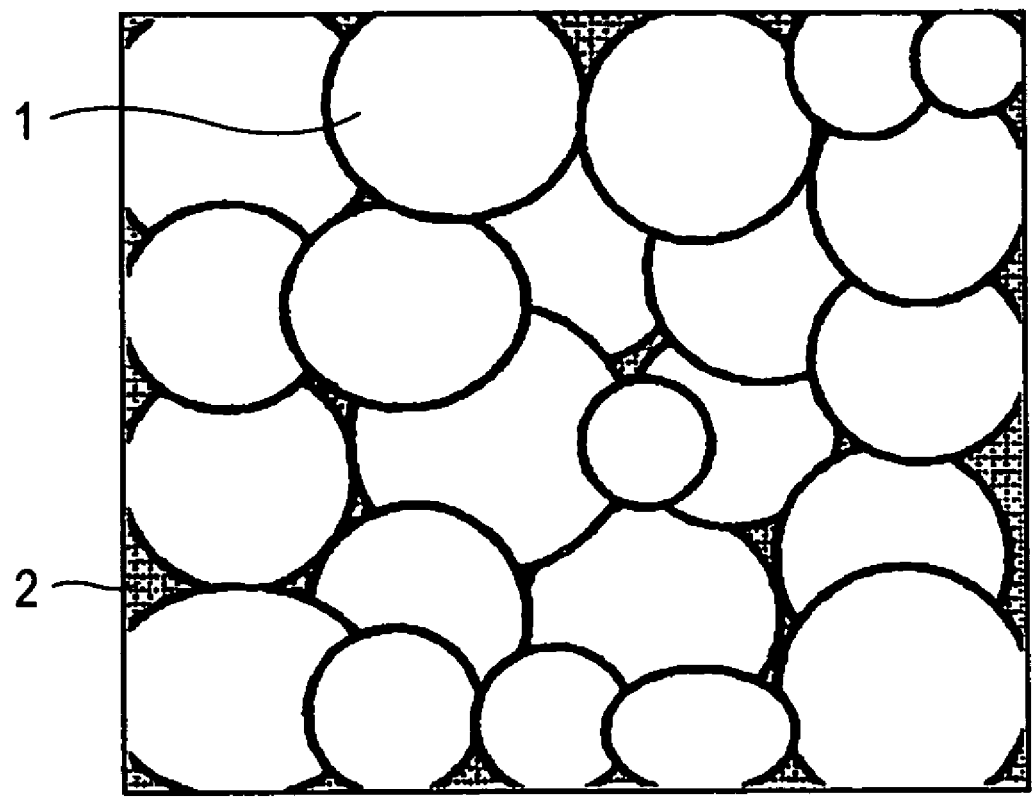
FIG. 1 is an enlarged typical view of a proton conducting membrane of the present invention.

In the drawings, the reference numeral 1 indicates a particle and the reference numeral 2 indicates a gap.

BEST MODE FOR CARRYING OUT THE INVENTION

A proton conducting membrane of the present invention, a method for producing the same and a fuel cell using the same will be described in detail in connection with the drawings.

A fuel cell according to the present embodiment comprises a positive electrode (air electrode), a negative electrode (fuel electrode) and a proton conducting membrane provided interposed between the two electrodes, and the structure of this proton conducting membrane has characteristics. This proton conducting membrane is characterized in that it has particles comprising a metal-oxygen crosslinked structure, the surface of the aforementioned particles is provided with an acid group and the aforementioned particles form a continuity of particles so that only proton can pass through the membrane.

The structure of this proton conducting membrane will be described sequentially every clause.

1. Metal-Oxygen Crosslinked Structure

In the proton conducting membrane of the present invention, the crosslinked structure is a very important constituent element that takes part in the mechanical strength, heat resistance, dimensional stability, etc. of the membrane.

The proton conducting membrane according to the present embodiment thus has a crosslinked structure, making it possible to provide the proton conducting membrane with mechanical strength, durability and dimensional stability. In other words, when a crosslinked structure having a sufficient density is formed, neither great dimension change nor strength change occurs regardless of whichever the proton conducting membrane is swollen or dried.

Thus, since the proton conducting membrane of the present invention shows no change of dimension from when dried to when swollen, MEA can be easily produced and the membrane undergoes no regular elongation/shrinkage due to change of temperature and humidity in the fuel cell caused by the change of operating conditions even during the operation of the fuel cell. Accordingly, there occurs no breakage of membrane or destruction of MEA. Further, since the membrane cannot be weakened when swollen, risk of not only the aforementioned dimensional change but also membrane breakage in the case of occurrence of pressure difference in the fuel cell can be avoided.

On the other hand, none of the conventional fluororesin-based membrane such as Nafion membrane and the proton conducting membrane comprising a polymer material having an aromatic molecular structure in its main chain has a crosslinked structure. Therefore, the membrane undergoes a great change of structure due to creep or the like at high temperatures, and as a result, the operation of the fuel cell at high temperatures becomes unstable.

Further, a crosslinked structure comprising a metal-oxygen bond, e.g., silicon-oxygen bond, aluminum-oxygen bond, titanium-oxygen bond, zirconium-oxygen bond is relatively stable even when exposed to high temperature and humidity under strongly acidic (proton present) conditions as in fuel cell and thus can be preferably used as a crosslinked structure in the fuel cell. In particular, the silicon-oxygen bond can be easily formed and is inexpensive and thus can be preferably used.

On the contrary, in order to form such a crosslinked structure, an organic polymer-based material such as epoxy resin, crosslinkable acrylic resin, melamine resin and unsaturated polyester resin may be used, but a prolonged stability can be difficultly obtained when the membrane is exposed to high temperature and humidity under strongly acidic conditions as in the fuel cell.

As the crosslinked structure of the present invention there is preferably used mainly a silicon-oxygen bond, but metal-oxygen bonds other than the aforementioned silicon-oxygen bond or phosphorus-oxygen bond, boron-oxygen bond, etc. may be additionally used so far as the cost or ease of production cannot be sacrificed. In the case where a metal-oxygen bond other than silicon-oxygen bond is additionally used, the ratio of the silicon-oxygen bond in the crosslinked structure is not specifically limited, but the atomic ratio of silicon to other metals, etc. is normally 50 mol-% or more, preferably 70 mol-% or more, more preferably 80 mol-% or more based on 100 mol-% of all metal atoms.

2. Particles, Continuity of Particles, and Gap Between Particles

The proton conducting membrane of the present invention can be provided with a high protonic conductivity by meeting the following requirements.

1) An acid group is present in a high concentration.

2) Formation of a proton conducting channel in which an acid is continuously present.

During the operation of the fuel cell, proton produced at the anode is supplied into the membrane while proton in the membrane is consumed at the cathode. Some protons are previously present in the proton conducting membrane, the concentration of proton in the anode is raised by the supply of proton, and the concentration of proton in the cathode is lowered by the consumption of proton. The gradient of proton concentration thus produced in the membrane is a driving force for the diffusion of proton from the anode to the cathode. When sufficient protons are not present in the membrane, the cathode lacks of proton, making it impossible to expect stable operation of fuel cell. Accordingly, a sufficient concentration of proton in the membrane is needed.

By allowing an acid group to be present in a high concentration so that the concentration of proton in the membrane can be raised, stable operation of fuel cell can be attained.

Further, the diffusion/movement of proton by gradient of proton concentration causes shortage of proton on the cathode unless it occurs at a sufficiently high rate, it is necessary that a proton movement channel be assured to make efficient diffusion possible. Since a proton normally moves in the form of hydrate, there is preferably provided a continuous phase having a good affinity for water or an acid accumulated therein in a high concentration such that proton can be stable present, which continuous phase extending from anode to cathode, i.e., proton conducting channel communicated from the main surface to the opposite surface of proton conducting membrane.

In other words, the proton conducting membrane which operates stably even at high temperatures needs to have a proton conducting membrane formed therein having acid groups present in a high concentration and continuously arranged. Further, the structure comprising the proton conducting membrane needs to form a chemical structure which undergoes no deformation even at high temperatures.

The proton conducting membrane of the present invention has particles comprising a metal-oxygen crosslinked structure wherein the aforesaid particles have an acid group provided on the surface thereof and form a continuity.

Herein, the continuity of particles indicates a structure in which the aforesaid particles are continuously present in such an arrangement that they come in contact with each other. The continuity of particles will be described in connection with FIG. 1.

FIG. 1 is an enlarged typical view of a proton conducting membrane of the present invention. In the proton conducting membrane of the present invention, a large number of particles 1 comprising a metal-oxygen crosslinked structure are present densely and continuously in the membrane as shown in FIG. 1. When such a structure is formed, a geometrically completely dense structure can be difficultly formed, thereby causing the formation of a clearance 2 between particles (gap between particles). The densely populated particles preferably form a bond therebetween, and the bond between the particles may be a metal-oxygen bond (typically silicon-oxygen bond) obtained by the mutual reaction of unreacted metal-oxygen crosslinking groups present on the surface of the particles or a crosslinking agent (described later) which is separately added may act as an adhesive between particles. Thus, when an interparticle bond obtained by the mutual reaction of metal-oxygen crosslinking groups is provided, the strength of the membrane is further enhanced.

Further, since the surface of the particles has an acid group incorporated therein, there are a large number of acid groups on the surface of the gap between particles (i.e., border of gap between particles). In other words, the gap between particles acts as a proton conducting channel having acid groups accumulated therein.

The gap between particles is preferably communicated from the main surface to the opposite surface of the proton conducting membrane of the present invention. In other words, when the proton conducting channel is communicated from the main surface to the opposite surface of the proton conducting membrane, proton can efficiently diffuse/move from the anode to the cathode. On the contrary, when the gap between particles is not communicated from the main surface to the opposite surface of the proton conducting membrane, the protonic conductivity is remarkably deteriorated.

Figure 2:
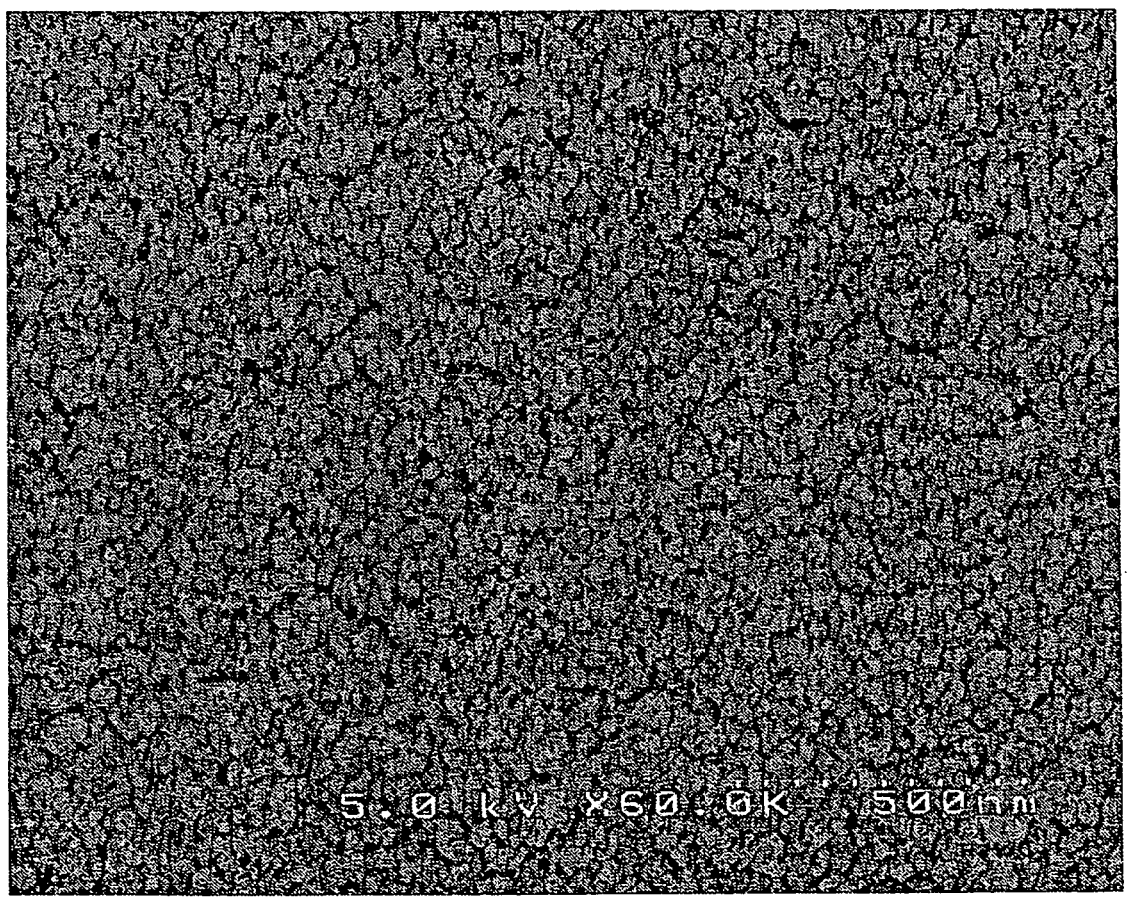
FIG. 2 is an electron microphotograph illustrating a sectional structure of a proton conducting membrane of the present invention.

The structure of such a continuity of particles can be observed directly from electron microphotograph or the like. By way of example, an electron microphotograph of a proton conducting membrane of the present invention is shown in FIG. 2. In FIG. 2, the particles 1 form a continuous structure and its gap 2 (black portion) is observed, and it can thus be confirmed that the structure of FIG. 2 is similar to the typical diagram of FIG. 1.

3. Details of Particles

The proton conducting membrane of the present invention has particles comprising a metal-oxygen crosslinked structure wherein the aforesaid particles have an acid group provided on the surface thereof.

Referring to the form of the particles, when the particles are in the form of sphere, it is advantageous in that the strength of the membrane is somewhat high, but the particles are not necessarily needed to be in the form of sphere close to true sphere but may be in the form of nonsphere such as flat grain and column. The particles are not specifically limited so far as they have a definite structural border.

The crosslinked structure comprising a metal (typical example: silicon)-oxygen bond is a so-called glass structure that is stable even at high temperatures as previously mentioned and thus is appropriate as a basic structure for proton conducting membrane requiring heat resistance.

In the proton conducting membrane of the present invention, the acid group on the surface of the particles is preferably a sulfonic acid group. A sulfonic acid is an extremely strong acid and the use of a sulfonic acid as an acid group provides an extremely good proton dissociability. In other words, a sulfonic acid causes extremely little inhibition of diffusion of proton and thus can be preferably used in the present invention. A sulfonic acid has a good durability against oxidation and a stable heat resistance up to 180° C. and thus can be preferably used in the present invention. When the surface of the particles shown in FIG. 2 was measured by XPS, the presence of sulfonic acid on the surface of the particles was then confirmed.

In the proton conducting membrane of the present invention, the average particle diameter of the various particles comprising a continuity of particles which forms a particulate skeleton structure is preferably from 3 to 200 nm. When the average particle diameter of the particles exceeds 200 nm, the surface area of the particles taking major part in protonic conduction decreases, making it impossible to obtain a high conductivity, and the gap between particles increases too much, rendering the proton conducting membrane brittle and giving an apprehension that the leakage of fuel gas (so-called chemical short) might occur. On the contrary, when the average particle diameter of the particles is not greater than 3 nm, the resulting proton conducting membrane is similar to a uniform layer that cannot provide a sufficient proton conducting channel, making it difficult to attain an efficient protonic conduction. Accordingly, the average particle diameter of the particles is preferably from 3 to 200 nm, more preferably from 5 to 100 nm, even more preferably from 10 to 50 nm. When the average particle diameter of the particles falls within the above defined range, a sufficient proton conducting channel can be assured while providing a sufficient strength. The particle diameter can be determined directly by an electron microphotograph shown in FIG. 2 but may be determined also by means such as small-angle X-ray scattering. For example, in the proton conducting membrane of FIG. 2, the average particle diameter of the particles was determined to be about 20 nm from direct measurements of electron microphotograph and results of small-angle X-ray scattering.

Further, concerning the distribution of particle diameters, the continuity of particles may be either a continuity of particles having a uniform particle diameter or a continuity of particles having uneven particle diameter. Herein, when the distribution of particle diameters of the particles is not uniform, a geometrical gap can be easily formed, though depending on the particle diameter, making it likely that a high ionic conductivity can be attained. On the other hand, when the particle diameter distribution is wide, dense packing can be made, contributing to the enhancement of fuel gas barrier properties or membrane strength. Accordingly, the particle diameter distribution is preferably predetermined depending on the use. The distribution of particle diameter of the particles is properly predetermined taking into account ionic conductivity, fuel gas barrier properties and membrane strength. The particle diameter control can be made by adjusting conditions such as structure/molecular weight of the raw material used, kind/concentration of the solvent, kind/amount of the catalyst and reaction temperature. The method for controlling the particle diameter will be described in detail later with reference to the method for producing a proton conducting membrane of the present invention. The particle diameter distribution can be determined by the aforementioned small-angle X-ray scattering or the like.

As previously mentioned, the surface of the particles contained in the proton conducting membrane of the present invention has an acid group, preferably sulfonic acid group, present thereon. The sulfonic acid group may be in the form of a sulfonic acid-containing compound which is injected (dope) in the gap between particles, but in this case, it is likely that the sulfonic acid group can be scattered and lost (so-called dope out) from the proton conducting membrane when the proton conducting membrane is used as an electrolyte membrane for fuel cell over an extended period of time.

On the contrary, when a sulfonic acid group is fixed to the surface of the particles by conjugated bonding, a stabilized performance can be attained.

The structure having a sulfonic acid group fixed on the surface of particles is not specifically limited, but preferred examples of such a structure include an acid group-containing structure (A) represented by the following formula (1):

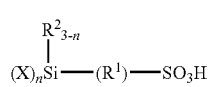
(1)

wherein X represents —O— bond taking part in crosslinking or OH group; $R^1$ represents a hydrocarbon group having 20 or less carbons; $R^2$ represents any of $CH_3$, $C_2H_5$, $C_3H_7$ and $C_6H_5$; and n represents an integer of from 1 to 3, with the proviso that when n is 1, $R^2$ may be a mixture of different substituents.

This acid group-containing structure (A) is directly covalently bonded to the silicon-oxygen crosslink possessed by the particles via silicon-oxygen bond. Thus, since the crosslinked structure and the acid group in the particulate structure are directly bonded to each other, the acid group-containing structure (A) can be provided with stability and heat resistance and thus can be preferably used.

The particles may have a silicon-oxygen crosslinked material (e.g., crosslinking agent described later) other than the acid-containing structure (A), but in this case, the amount of silicon atoms in the acid-containing structure (A) preferably accounts for 3% or more of the total amount of silicon atoms in the particles. When the amount of silicon atoms is 3% or less, the amount of acid groups present on the surface decreases, making it impossible to attain a sufficient conductivity. On the other hand, there is no specific upper limit and it is preferred that the acid group be incorporated as much as possible, but when the amount of the acid-containing structure (A) increases, the proton conducting membrane tends to become brittle, and the amount of silicon atoms is preferably proper, 80% or less by way of example.

The acid-containing structure (A) is a structure represented by the chemical formula (1), but in the formula (1), the structure of $R^1$ is preferably a saturated alkylene group represented by the formula (2):

—$(CH_2)_n$— (2)

wherein n represents an integer of from 1 to 20.

Herein, $R^1$ may be a molecular chain having an aromatic ring or various hetero atoms rather than alkylene group, but in this case, $R^1$ needs to be a structure having heat resistance, acid resistance, oxidation resistance, etc. On the other hand, $R^1$ which is an alkylene group has good heat resistance, acid resistance and oxidation resistance and, and the structure of the formula (2) having no branches can be particularly preferably used. Herein, the length n of the alkylene chain is not specifically limited, but if the length n is too great, the durability of the alkylene group can be deteriorated, and n is thus preferably from 1 to 20, and those having n of 3 can be easily available and thus can be preferably used.

Further, as the particles of the present invention there may be used not only the acid-containing structure (A) but also various crosslinking agents. The incorporation of the crosslinking agent causes the formation of a more rigid crosslink that gives particles which are more stable even at high temperatures, thereby providing the proton conducting membrane with an enhanced stability.

As the crosslinking agent forming the particles there may be preferably used, e.g., a crosslinked structure (B) represented by the following formula (3):

$Si(X)_n(R^3)_{4-n}$ (3)

wherein $R^3$ represents an alkyl group having 20 or less carbon atoms; X represents —O— bond taking part in crosslinking or OH group; and n represents an integer of from 2 to 4.

Herein, the crosslinked structure (B) is an essential silica crosslinked structure and is very stable to heat and oxidation. Further, the raw material of the crosslinked structure (B) is easily available, making it possible to realize an inexpensive proton conducting membrane.

Herein, the crosslinked structure (B) wherein the number n of crosslinking groups is 4 forms a rigid crosslinked structure to have a high durability and can stably fix the acid-containing structure (A) and thus can be preferably used. Further, those having n of 2 or 3 provide the particular structure with flexibility and, as a result, can enhance the flexibility of the proton conducting membrane also. Crosslinked structures (B) having different numbers n of crosslinking groups may be used in admixture as necessary.

Further, as the crosslinking agent forming the particulate structure there may be used also a bridged crosslinked structure (C) represented by the following formula (4):

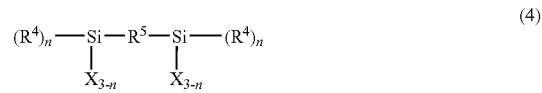
(4)

wherein X represents —O— bond taking part in crosslinking or OH group; $R^5$ represents a molecular chain group having 1 to 30 carbon atoms; $R^4$ represents a group selected from the group consisting of $CH_3$, $C_2H_5$, $C_3H_7$, $C_4H_9$ or $C_6H_5$; and n represents an integer of 0, 1 or 2.

This bridged crosslinked structure (C) has a structure having two crosslinkable silyl groups bridged by a molecular chain $R^5$. This bridged crosslinked structure (C) has an extremely high crosslinking reactivity and can form a rigid crosslinked structure that contributes to the enhancement of stability of particles. Further, the bridged crosslinked structure (C) can be adjusted in its physical properties such as flexibility by the kind and length of the molecular chain in the bridged structure or the number (3−n) of crosslinking groups X and thus can be preferably used.

For example, if the number (3−n) of crosslinking groups in the bridged crosslinked structure (C) represented by the formula (4) and (3−n) represents an integer of 1 or 2, and $R^4$ is a methyl group, there can be produced a membrane which is entirely flexible and thus can be easily handled.

Further, in the case where the bridged crosslinked structure (C) is used, $R^5$ in the formula (4) preferably has a structure represented by the following formula (2):

—$(CH_2)_n$— (2)

wherein n represents an integer of from 1 to 30.

The bridged crosslinked structure (C) wherein $R^5$ is an alkylene group has good heat resistance, acid resistance and oxidation resistance, and the structure of the formula (2) having no braches can be particularly preferably used. Herein, the length n of the alkylene chain of $R^5$ is not specifically limited, and if the length n is too great, the durability of the alkylene group can be deteriorated, and n is preferably from 1 to 30, and those having n of 8 can be easily available and thus can be preferably used.

Herein, $R^5$ may be a molecular chain having an aromatic ring or various hetero atoms rather than alkylene group, but in this case, $R^5$ needs to be a structure having heat resistance, acid resistance, oxidation resistance, etc.

Further, besides the aforementioned compositions, metal oxides such as titanium oxide, zirconium oxide and aluminum oxide, too, may be included.

4. Concerning the Gap Between Particles

As previously mentioned, the proton conducting membrane of the present invention has particles comprising a silicon-oxygen crosslinked structure, and the aforesaid particles have an acid group on the surface thereof and form a continuity. The continuity of particles geometrically forms a gap between particles as previously mentioned. In particular, if the gap between particles is communicated from the main surface to the opposite surface of the proton conducting membrane, the gap between particles forms a proton conducting channel through which protons effectively diffuse and move from the anode to the cathode.

The width of the gap between particles is not specifically limited, but when the width of the gap between particles is extremely small, the protonic conduction is inhibited, and when the width of the gap between particles is too great, the resulting membrane not only is brittle but also leaks the fuel gas (so-called chemical short) to reduce the electricity-generating efficiency. The detailed average width of the gap is preferably, e.g., from 0.5 nm to 500 nm, more preferably from 1 nm to 200 nm, even more preferably from 1 to 10 nm.

The width of the gap between particles can difficultly be directly observed but can be estimated by pore diameter distribution determined by the measurement of specific surface area by mercury porosimetry or BET method as substitute evaluation method. For example, when the proton conducting membrane shown in FIG. 2 was estimated for pore diameter distribution (volume distribution) by mercury porosimetry (Autopore IV9500, produced by Shimadzu Corporation), the width of the gap between particles was about 10 nm.

By the way, since the side wall of the gap between particles (i.e., surface of particles) has an acid group incorporated therein as previously mentioned, the gap between particles is hydrophilic, making it possible to introduce efficiently water into the gap and hence replace the gap almost completely by water. It is essential for the proton conducting membrane that water, which is a medium for protonic conduction, can be introduced into the gap between particles. In general, during the operation of a fuel cell, the gap between particles is kept partly or wholly filled with dampening water for fuel gas, water produced by reaction on the cathode or the like. Proton (hydrogen ion) occurs in a form hydrated by these plurality of water molecules (hydronium ion), and the diffusive movement of the hydronium ion causes proton to be transmitted. In other words, it is preferred that the gap between particles be filled with ambient atmosphere when dried but be filled with dampening water for fuel gas or water produced by reaction on the cathode during the operation of the fuel cell.

The volume of the gap between particles can be similarly estimated by mercury porosimetry or BET method, but as a simpler method involving the utilization of the fact that the gap between particles can be replaced by water there may be used a water content measuring method. In other words, the water content which can be calculated by the equation (swollen weight−dried weight)/(dried weight) from swollen weight of proton conducting membrane which has been dipped in water and freed of water content from the surface thereof and dried weight of proton conducting membrane which has been dried (at 100° C. under reduced pressure) is a numerical value that is related to the volume fraction of the gap. In other words, this corresponds to porosity.

In the proton conducting membrane of the present invention, the aforementioned water content is preferably 3% by weight or more. When the water content falls below 3% by weight, the gap between particles, i.e., volume of the proton conducting channel is insufficient, making it impossible to obtain a high conductivity. On the contrary, when the water content exceeds 50% by weight, the proton conducting membrane can easily transmit the fuel gas, causing chemical short, and tends to be brittle and weak, and the water content is thus preferably 50% by weight or less. Thus, the water content is preferably from 3 to 50% by weight, but more preferably from 5 to 30% by weight.

Moreover, referring to the capacity (volume) of the gap between particles, the difference in volume between when the gap between particles is filled with water and when the gap between particles is dried to have air therein is preferably 3% by volume or less. If there is some volume difference between when dried and when moistened with water (expansion due to water moistening), the bonding of the membrane to the electrode requires adjustment of water content, etc., complicating the assembly process, and the change of water content of the membrane during the operation of the fuel cell causes the generation of great stress on the membrane-electrode assembly leading to the exfoliation of the membrane or catalyst from the electrode.

The volume difference can be determined by the difference between dried volume measured when dried and water content when filled with water but can be simply determined by the degree of swelling of the dried membrane and the swollen membrane. In this case, the particles have a high density crosslinked structure and doesn't swell even when moistened with water, and swelling may thus be rendered attributed to the change of the volume of the gap between particles. The proton conducting membrane of the present invention normally exhibits a swelling degree of 3% or less when moistened with water and shows no great volume change even during the operation of the fuel cell and thus can be extremely fairly used.

Further, the gap between particles may be filled with a hydrophilic material or an electrolyte material. However, when the gap between particles is filled with these materials, the protonic conductivity normally decreases. However, this can exert an effect of preventing chemical short due to permeation of fuel gas or preventing penetration of fuel in the case where a liquid fuel such as methanol is directly introduced into the fuel cell, and the gap between particles may thus be previously filled with these materials as necessary.

5. Method for Producing Proton Conducting Membrane Having Particulate Structure

A method for producing a proton conducting membrane according to the present embodiment will be described hereinafter.

The method for producing a proton conducting membrane having particles comprising a silicon-oxygen crosslinked structure wherein the aforesaid particles have an acid group incorporated in the surface thereof and form a continuity is not specifically limited, but the proton conducting membrane can be produced by, e.g., the following method.

In other words, the proton conducting membrane of the present invention can be produced by a first step of preparing a mixture comprising a mercapto group-containing compound (D) having a mercapto group and a condensation-reacting hydrolyzable silyl group covalently bonded to the mercapto group and/or silanol group and a polarity controller (E), a second step of film-forming the aforesaid mixture into a substrate, a third step of subjecting the hydrolyzable silyl group contained in the mixture thus film-formed to hydrolysis and condensation and/or the silanol contained therein to condensation to form a film having a continuity of particles comprising a silicon-oxygen crosslinked structure, and a fourth step of oxidizing the aforesaid mercapto group in the aforementioned film to a sulfonic acid group which is then introduced into the surface of the aforesaid particles.

The various steps will be described in detail hereinafter.

5.1 First Step

At the first step, a mixture comprising a mercapto group-containing compound (D) having a mercapto group and a condensation-reacting hydrolyzable silyl group covalently bonded to the mercapto group and/or silanol group and a polarity controller (E) is prepared.

5.1.1 Mercapto Group-Containing Compound (D)

The mercapto group-containing compound (D) is not specifically limited so far as it has a mercapto group and a condensation-reacting hydrolyzable silyl group covalently bonded to the mercapto group and/or silanol group.

This mercapto group-containing compound (D) will be exemplified below, but the present invention is not limited thereto.

As the mercapto group-containing compound (D) there may be exemplified a mercapto group-containing compound (G) represented by the following formula (6):

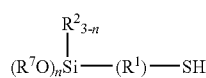

(6)

wherein $R^7$ represents any of H, $CH_3$, $C_2H_5$, $C_3H_7$ and $C_4H_9$; $R^1$ represents a hydrocarbon group having 20 or less carbon atoms; $R^2$ represents any of $CH_3$, $C_2H_5$, $C_3H_7$ and $C_6H_5$; and n represents an integer of from 1 to 3, with the proviso that when n is 1, $R^2$ may be a mixture of different substituents.

Herein, $R^1$ is not specifically limited so far as it is a hydrocarbon group having 20 or less carbon atoms, but a methylene chain (—$CH_2$— chain) free of aromatic ring or branches is stable to acid or oxidation and thus can be preferably used. In particular, those having three carbon atoms (i.e., $R^1$ is —$CH_2CH_2CH_2$—) are inexpensive and easily available and thus can be preferably used. Even $R^1$ contains a branched structure or aromatic ring, it is no special problem so far as it is stable under the fuel cell operating conditions.

Further, in the case where $R^7$ is H, the pot life of the mercapto group-containing compound is reduced, making it necessary to handle it with care. In the case where $R^7$ is an alkyl group, the mercapto group-containing compound has a long pot life and can be easily controlled in reaction and thus can be preferably used. In particular, those wherein $R^7$ is $CH_3$ or $C_2H_5$ are inexpensive and easily available and thus can be preferably used.

As the alkyl group ($R^2$) there may be used various substituents exemplified in the formula (6), but those wherein $R^2$ is $CH_3$ are inexpensive and easily available and thus can be preferably used.

Referring to the ratio of the crosslinking group ($OR^7$) and the alkyl group ($R^2$), the more the ratio of the crosslinking group is, the more firmly can be fixed the compound to the particles, but on the other hand, the incorporation of the alkyl group makes it possible to render the proton conducting membrane flexible. Including the combination with other crosslinking agents, the ratio of the crosslinking group to the alkyl group can be properly selected from the standpoint of balance of physical properties and stability, but the number of crosslinking groups is preferably 2 or 3, and those having three crosslinking groups are more stably fixed and thus are more desirable.

Examples of the raw material represented by the formula (6) include 3-mercaptopropyltrimethoxysilane, 3-mercaptopropyltriethoxysilane, 3-mercaptopropyl tripropoxysilane, 3-mercaptopropyltributoxysilane, 2-mercaptoethyl trimethoxysilane, 2-mercaptoethyl triethoxysilane, 2-mercaptoethyl tripropoxysilane, 2-mercaptoethyl tributoxysilane, mercaptomethyl trimethoxysilane, 3-mercaptopropylmethyl dimethoxysilane, 3-mercaptopropyl methyl dipropoxysilane, 3-mercaptopropylmethyl dibutoxysilane, 3-mercaptopropylethyl dimethoxysilane, 3-mercaptopropylethyl diethoxysilane, 3-mercaptopropylbutyl diethoxysilane, 3-mercaptopropyl phenyl dimethoxysilane, mercaptomethyl methyl diethoxysilane, etc., but the present invention is not limited thereto.

Among these raw materials, 3-mercaptopropyl trimethoxysilane (produced by Shin-Etsu Chemical Co., Ltd.) can be available in a large amount at reduced cost and thus can be preferably used.

Further, examples of the mercapto group-containing compound (D) include a mercapto group-containing condensation product (H) represented by the following formula (7).

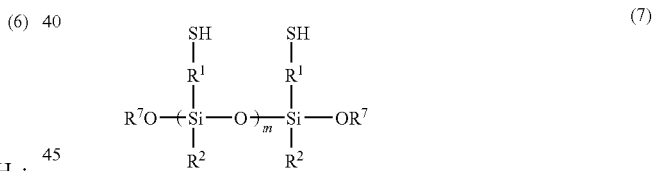

(7)

wherein $R^7$ represents any of H, $CH_3$, $C_2H_5$, $C_3H_6$ and $C_4H_9$; $R^1$ represents a hydrocarbon group having 20 or less carbon atoms; $R^2$ represents any of OH, $OCH_3$, $OC_2H_5$, $OC_3H_6$, $OC_4H_9$, $CH_3$, $C_2H_5$, $C_3H_7$, $C_4H_9$ and $C_6H_5$; m represents an integer of from 1 to 100; and the mercapto group-containing condensation product may be an annular structure or branched structure wherein $R^7$ forms —Si bond or $R^2$ forms O—Si bond.

This is a condensation product of the mercapto group-containing compound (G) and can be obtained by, e.g., condensing the mercapto group-containing compound (G). When such a condensation product is used, the continuity of acid groups is enhanced to obtain a higher conductivity, and at the same time, the number of crosslinking groups per molecule increases to enhance the stability of bonding to particles, making it possible to attain a higher durability.

$R^1$, $R^2$ and $R^7$ are similar to the case of the mercapto group-containing compound (G), and the compound (H) may be an annular structure or branched structure wherein $R^7$ forms —Si bond or $R^2$ forms O—Si bond.

Further, when the polymerization degree (m+1) is 2 or less, the effect of forming a continuity of acid groups and increasing the number of crosslinking groups by condensation cannot be exerted, and when the polymerization degree (m+1) exceeds 100, gelation, etc. occur, making it difficult to use the compound (H) as a raw material.

Further, examples of the mercapto group-containing compound (D) include a mercapto group-containing condensation product (I) represented by the following formula (8):

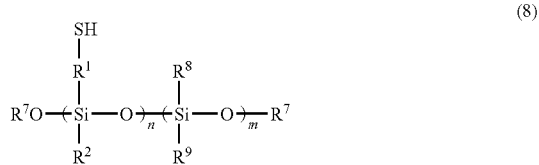

(8)

wherein $R^7$ represents any of H, $CH_3$, $C_2H_5$, $C_3H_6$ and $C_4H_9$; $R^1$ represents a hydrocarbon group having 20 or less carbon atoms; $R^2$, $R^8$ and $R^9$ each independently represent any of OH, $OCH_3$, $OC_2H_5$, $OC_3H_6$, $OC_4H_9$, $CH_3$, $C_2H_5$, $C_3H_7$, $C_4H_9$ and $C_6H_5$; n and m each independently represent an integer of from 1 to 100; and the mercapto group-containing condensation product may be an annular structure or branched structure wherein $R^7$ forms —Si bond or $R^2$, $R^8$ and $R^9$ each forms —O—Si bond.

This is a product of cocondensation of the mercapto group-containing compound (G) with a crosslinking agent (J) described later. Examples of the crosslinking agent (J) include tetramethoxysilane, tetraethoxysilane, tetraisopropoxysilane, tetrabutoxysilane, etc. Among these examples, tetramethoxysilane and tetraethoxy silane are general-purpose products which are inexpensive and easily available in a large amount and thus can be preferably used. The compound (J) may be a copolymer with: a methoxylation product of methyl trimethoxysilane, phenyl trimethoxysilane, dimethyl dimethoxysilane, phenylmethyl dimethoxysilane, ethyl trimethoxysilane, n-propyltrimethoxysilane, i-propyltrimethoxysilane, n-butyltrimethoxysilane, n-hexyltrimethoxysilane, n-octyltrimethoxysilane, n-undecyltrimethoxysilane, n-dodecyltrimethoxysilane, n-hexadecyltrimethoxysilane or n-octadecyltrimethoxysilane, etc.; ethoxylation product thereof; isopropoxylation product thereof; or butoxylation product thereof, etc. The present invention is not limited to the compounds, and the crosslinking agent (J) is not limited so far as it is a compound represented by the formula (8).

$R^1$, $R^2$ and $R^7$ are similar to the case of the mercapto group-containing compound (G) and $R^8$ and $R^9$ are similar to the case of the basic structure of the crosslinking agent (J), but the compound (I) may be an annular structure wherein $R^7$ connects to Si a molecule or an annular or branched structure wherein $R^2$, $R^8$ and $R^9$ each forms —O—Si bond.

Further, if the polymerization degree (m+n) falls below 2, the effect of forming a continuity of acid groups and increasing the number of crosslinking groups by condensation cannot be exerted, and when the polymerization degree (m+n) exceeds 200, gelation, etc. occur, making it difficult to use the compound (I) as a raw material. The mercapto group-containing condensation product (I) allows adjustment of substituents to a great extent as compared with the mercapto group-containing condensation product (H) and thus can be used as raw material to a higher polymerization degree without being gelated.

This mercapto group-containing condensation product (I) has a high degree of freedom of structural design and thus can have a high crosslinkability structure incorporated thereinto to provide a firmer fixation to particles and hence attain a stable protonic conductivity or can have a lowered crosslinking degree to render the membrane flexible or adjust various physical properties.

These mercapto group-containing condensation products (H), (I) can be synthesized by known methods, and these methods are disclosed in JP-A-9-40911, JP-A-8-134219, JP-A-2002-30149, Journal of Polymer Science: Part a: Polymer Chemistry, vol. 33, pp. 751-754, 1995, Journal of Polymer Science Part A: Polymer Chemistry, vol. 37, pp. 1,017-1,026, 1999, etc.

These mercapto group-containing compounds (D) may be previously oxidized with an oxidizing agent used at the fourth step described later before use. In this case, the fourth step may be omitted.

Further, at the first step, a crosslinking agent (J) represented by the following formula (10) may be added.

(10)

wherein $R^3$ represents an alkyl group having 20 or less carbon atoms; $R^{10}$ represents OH, $OCH_3$, $OC_2H_5$, $OC_3H_6$, $OC_4H_9$, $OCOCH_3$ or Cl; and n represents an integer of from 2 to 4.

Herein, the crosslinking agent (J) is not specifically limited so far as it is a structure capable of forming Si—O bond, and any structure represented by the formula (10) may be used. Examples of the crosslinking agent (J) include tetramethoxysilane, tetraethoxysilane, tetraisopropoxysilane, tetrabutoxysilane, etc. Among these examples, tetramethoxysilane and tetraethoxy silane are general-purpose products which are inexpensive and easily available in a large amount and thus can be particularly preferably used. The compound (J) may be a copolymer with: a methoxylation product of methyl trimethoxysilane, phenyl trimethoxysilane, dimethyl dimethoxysilane, phenylmethyl dimethoxysilane, ethyl trimethoxysilane, n-propyltrimethoxysilane, i-propyltrimethoxysilane, n-butyltrimethoxysilane, n-hexyltrimethoxysilane, n-octyltrimethoxysilane, n-undecyltrimethoxysilane, n-dodecyltrimethoxysilane, n-hexadecyltrimethoxysilane or n-octadecyltrimethoxysilane, etc.; ethoxylation product thereof; isopropoxylation product thereof; or butoxylation product thereof, etc.

Further, as a material playing role similar to that mentioned above there may be used a hydrolyzable compound comprising titanium or zirconium. Specific examples of such a hydrolyzable compound include titanium methoxide, titanium ethoxide, titanium n-propoxide, titanium i-propoxide, titanium n-butoxide, titanium i-butoxide, titanium t-butoxide, zirconium ethoxide, zirconium n-propoxide, zirconium i-propoxide, zirconium n-butoxide, zirconium i-butoxide, zirconium t-butoxide, and complexes thereof with acetyl acetone, acetoacetic acid ester, ethanolamine, diethanolamine or triethanolamine, etc.

When this crosslinking agent (J) is used, the crosslink density of particles or the interparticle bond strength can be adjusted, making it possible to properly control strength and flexibility.

Further, at the first step, a bridging/crosslinking agent (K) represented by the following formula (11) may be added.

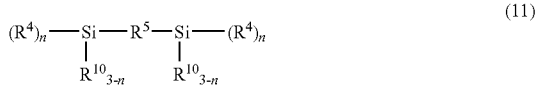 (11)

wherein $R^{10}$ represents OH, $OCH_3$, $OC_2H_5$, $OC_3H_6$, $OC_4H_9$, $OCOCH_3$ or Cl; $R^5$ represents a $C_1$-$C_{30}$ carbon group-containing molecular chain group; $R^4$ represents any group selected from $CH_3$, $C_2H_5$, $C_3H_7$, $C_4H_9$ and $C_6H_5$; and n represents an integer of from 0, 1 or 2.

Herein, $R^5$ in the formula (11) represents a $C_1$-$C_{30}$ carbon atom-containing molecular chain but is preferably a straight-chain alkylene group.

Specific examples of the crosslinking agent (K) having the structure of the formula (11) correspond to, e.g., 1,2-bis(triethoxysilyl)ethane, 1,6-bis (trimethoxysilyl)hexane, 1,8-bis (triethoxysilyl) octane, 1,9-bis(triethoxysilyl)nonane, which are commercially available from Gelest, Inc. Referring to those having a chain length other than this or the organic-inorganic composite crosslinking agent (F) having a hydrolyzable group other than this, a straight-chain hydrocarbon having unsaturated bond at both ends thereof, e.g., 1,3-butadiene, 1,9-decadiene, 1,12-dodecadiene, 1,13-tetradecadiene, 1,21-docosadiene can be subjected to hydrosilylation reaction with various alkoxysilanes in the presence of a platinum complex catalyst to obtain a compound which is a corresponding crosslinkable compound.

When this crosslinking agent (K) is used, the crosslink density of particles or the interparticle bond strength can be adjusted, making it possible to properly control strength and flexibility.

5.1.2 Polarity Controller (E)

The polarity controller (E) is a structure controller adapted to form particles and can be preferably used in the present invention.

It has been previously mentioned that the proton conducting membrane of the present invention is required to allow diffusion and movement of material (hydrogen ion or hydrate) and thus preferably has a proton conducting channel formed therein for transporting ion, and the gap between particles plays the role.

In the proton conducting membrane of the present invention, the polarity controller (E) is used to form efficiently these particles and gap between particles.

In general, when an inorganic material such as tetraethoxysilane is similarly subjected to hydrolysis/condensation and then thoroughly heated (to, e.g., 800° C.), a glass-like dense crosslinked material can be obtained and micropores corresponding to ion channel are not formed. The process of hydrolysis, condensation and gelation (sol-gel reaction) of such an alkoxysilane has been studied in detail and is summarized in Brinker et al, "SOL-GEL SCIENCE", Academic press, Inc. 1990, Sakka, "Science of So-Gel Process", Agne Shofusha, 1988, etc. A sol-gel reaction involves sequential occurrence of growth of particles, bonding of particles and densification. Typical alkoxysilane materials have been analyzed in detail, and their reaction conditions, etc. have been made obvious.

The proton conducting membrane of the present invention is required to comprise an alkoxysilane material having substituents as a raw material and allow control over the particle diameter, bonding of particles and accompanying gap between particles, and studies were made to attain these requirements, and as a result, it was found that the addition of the polarity controller (E) makes it possible to control the formation of a continuity of particles and accompanying gap between particles.

The polarity controller (E) is an organic liquid which is preferably water-soluble. When the polarity controller (E) is water-soluble, the solubility of the mercapto group-containing compound (D) in a solvent can be adjusted in the case where the solvent is used (described later), making it possible to make proper control over the particle diameter and gap between particles. It is also advantageous in that the polarity controller (E) can be easily extracted from the membrane thus prepared by rinsing the membrane.

Further, the polarity controller (E) preferably has a boiling point of 100° C. or more and a melting point of 25° C. or more.

When the boiling point of the polarity controller (E) is too low, the polarity controller (E) evaporates during condensation reaction (conducted mainly under heating conditions) effected in the formation of the membrane, making insufficient control over the particle diameter and the gap between particles and hence making it impossible to provide sufficient conductivity. Accordingly, the boiling point of the polarity controller (E) is preferably not lower than the boiling point of a solvent, if used at the first step, particularly 100° C. or more, more preferably 150° C. or more, even more preferably 200° C. or more.

Further, in the case where the intermolecular mutual action of the polarity controller (E) is too great, it is likely that the polarity controller (E) can be solidified to form a great domain other than gap between particles, and in this case, the strength or fuel gas barrier properties of the membrane can be deteriorated. The magnitude of the intermolecular mutual action of the polarity controller (E) is almost related to melting point, and the melting point can be an index. The melting point of the polarity controller (E) to be used in the present invention is preferably 25° C. or less. When the melting point of the polarity controller (E) is 25° C. or less, a proper intermolecular mutual action can be expected, and the melting point of the polarity controller (E) is more preferably 15° C. or less.

Examples of such an organic material include those having a polar substituent such as hydroxyl group, ether group, amide group and ester group, those having an acid group such as carboxylic acid group and sulfonic acid group or salt thereof, those having a basic group such as amine or salt thereof, etc. Among these groups, the acids, bases and salts thereof must be given caution such that they have no mutual action with a catalyst, if used in the hydrolysis/condensation, and nonionic organic materials are more preferably used.

Specific examples of these nonionic organic materials include glycerin and derivatives thereof, ethylene glycol and derivatives thereof, ethylene glycol polymers (diethylene glycol, triethylene glycol, tetraethylene glycol, polyethylene glycol having various molecular weights, etc.), saccharides such as glucose, fructose, mannitol, sorbitol and sucrose, polyvalent hydroxyl compounds such as pentaerythritol, water-soluble resins such as polyoxyalkylene, polyvinyl alcohol, polyvinyl pyrrolidone and acrylic acid, carbonic acid esters such as ethylene carbonate and propylene carbonate, alkyl sulfur oxides such as dimethyl sulfoxide, amides such as dimethylformamide, polyoxyethylene alkyl ethers such as ethylene glycol monomethyl ether, etc., but the present invention is not limited thereto.

Further, ethylene glycol(mono/di)alkyl ethers obtained by alkyletherifying some or all of terminal OH groups in these ethylene glycols may be preferably used as well. Examples of these ethylene glycol(mono/di)alkyl ethers include monomethyl ether, dimethyl ether, monoethyl ether, diethyl ether, monopropyl ether, dipropyl ether, monobutyl ether, dibutyl ether, monopentyl ether, dipentyl ether, monodicyclopentenyl ether, monoglycidyl ether, diglycidyl ether, monophenyl ether, diphenyl ether and monovinyl ether divinyl ether of the aforementioned ethylene glycols. Some or all of terminal OH groups in the ethylene glycols may be esterified. Examples of these compounds include monoacetate and diacetate of the aforementioned ethylene glycols.

Further, in the case where an acid and salt thereof may be used, examples of the acid and salt thereof include acids such as acetic acid, propionic acid, dodecylsulfuric acid, benzenesulfonic acid, dodecylbenzenesulfonic acid and toluenesulfonic acid, and salts thereof, and in the case where a base and salt thereof may be used, examples of the base and salt thereof include ammonium salts such as trimethylbenzylammonium chloride, amines such as N,N-dimethylbenzylamine, and salts thereof. Further, amphoteric ionic compounds such as aminoacids, e.g., sodium glutaminate may be used as well.

Further, as the polarity controller (E) there may be used an inorganic salt or the like, but an inorganic salt normally has a high cohesive force (high melting point) and, even when incorporated in a mixture containing the mercapto group-containing compound (D), can difficultly make fine dispersion on the molecular level, making it much likely that a large crystal or amorphous solid can be produced to form a large agglomerate that impairs the physical properties or gas barrier properties of the membrane.

Further, in the present invention, other ionic surface active agents can be preferably used, and taking into account the mutual action with the catalyst, anionic, cationic and amphoteric surface active agents may be used as well.

Among these surface active agents, polyoxyalkylenes which are liquid water-soluble organic materials and have a proper compatibility (or proper incompatibility) with the mercapto group-containing compound (D) are preferred, and among these polyoxyalkylenes, ethylene glycol polymers can be particularly preferably used. These polyoxyalkylenes can be represented by the following general formula:

HO—(CH$_2$CH$_2$O—)$_n$H     (12)

Such an ethylene glycol polymer is commercially available in the form ranging widely from dimer (diethylene glycol) to polyethylene glycols having various molecular weights, can be properly predetermined in its compatibility, viscosity, molecular size, etc. and thus can be preferably used. In the present invention in particular, ethylene glycols ranging from diethylene glycol having a molecular weight of about 100 to polyethylene glycol having an average molecular weight of 600 can be more preferably used, and tetraethylene glycol or polyethylene glycol having a molecular weight of about 200 can be particularly preferably used.

The size of particles and gap between particles are determined by the compatibility with the mercapto group-containing compound (D), the balance of the compatibility with the entire membrane-forming material system, including solvent and additives, and the molecular weight and added amount of the polarity controller (E). In the case of the present invention, there is shown a relationship between the average molecular weight of the polarity controller (E) and the diameter of the gap between particles, and when a polyethylene glycol having a molecular weight of more than 600 is used, the diameter of the gap between particles increases, deteriorating the gas barrier properties or physical properties or rendering the membrane brittle, and on the contrary, when the molecular weight of the polyethylene glycol is less than 100, the diameter of the gap between particles decreases, rendering the membrane too dense and hence giving a tendency that a sufficient gap between particles is not formed.

The amount of the polarity controller (E) to be added depends on the kind and molecular weight of the polarity controller (E) used or the structure of the membrane and thus can difficultly be unequivocally defined but is normally from 3 to 150 parts by weight based on 100 parts by weight of the mercapto group-containing compound (D). When the amount of the polarity controller (E) falls below 3 parts by weight, the effect of controlling the particle diameter and the gap between particles can be little recognized, and when the amount of the polarity controller (E) exceeds 150 parts by weight, the gap between particles is too great, making it much likely that the membrane can be brittle or have a remarkably high gas permeability.

As mentioned above, the proton conducting membrane of the present invention can provide a membrane having a good balance of various physical properties such as fuel gas permeability and membrane strength because the use of the polarity controller (E) makes it possible to make tailored design and formation of the gap between particles, i.e., structure of proton conducting channel. In this respect, the proton conducting membrane of the present invention greatly differs from those which are unequivocally determined in their proton conducting channel by the molecular structure such as conventional sulfonated fluororesin membranes.

Further, the proton conducting membrane thus controlled undergoes no deformation even in high temperature and high humidity atmosphere and thus allows the fuel cell to operate stably even at high temperatures.

5.1.3 Mixing Method

As has been described, the mercapto group-containing compound (D), the polarity controller (E), and crosslinking agents (J) and (K) as optional components can be properly adjusted and used to adjust various physical properties such as protonic conductivity, heat resistance, durability and membrane strength.

Herein, in the case where the crosslinking agents (J) and (K) as optional components are added, the added amount thereof varies with the process and thus cannot be unequivocally defined, but the typical value of the sum of the amount of the crosslinking agents (J) and (K) is 900 parts by weight or less based on 100 parts by weight of the mercapto group-containing compound (D).

When the crosslinking agents are added in an amount of greater than the above defined range, the concentration of acid group on the surface of the particles decreases, making it likely that the protonic conductivity can be deteriorated.

In the case where these mixtures are prepared, a solvent may be used. The solvent to be used is not specifically limited so far as it allows the various materials to be uniformly mixed with each other. In general, alcohol-based solvents such as methanol, ethanol, 1-propanol, 2-propanol and t-butanol, ether-based solvents such as tetrahydrofurane and 1,4-dioxane can be preferably used.

The ratio of the solvent is not specifically limited but normally is preferably such that the solid concentration is from about 10 to 90% by weight.

Further, as described later, a catalyst (F) may be added at the same time.

Further, water required for hydrolysis may be injected. Water is normally added in an amount equimolecular to the hydrolyzable silyl group but may be added in a larger amount to accelerate the reaction or may be added in a smaller amount to inhibit the reaction.

Mixing may be carried out by a known method such as agitation and oscillation and its method is not specifically limited so far as thorough mixing can be made. If necessary, heating, pressing, defoamation, deaeration or the like may be effected.

Further, at the first step, other optional components such as reinforcing material, flexibilizer, dispersant, reaction accelerator, stabilizer, coloring agent, oxidation inhibitor and inorganic or organic filler may be added so far as the object of the present invention cannot be impaired.

5.2 Second Step

In the method for producing a proton conducting membrane of the present invention, the second step is a step of forming the mixture obtained at the first step into a film (film-forming).

In order to forming the mixture obtained at the first step into a film, a known method such as casting, coating and molding may be used. The method for forming the mixture into a film is not specifically limited so far as it can produce a uniform film. The thickness of the film is not specifically limited, but the mixture can be formed into a film having an arbitrary thickness of from 10 μm to 1 mm. Since the thickness of the proton conducting membrane for fuel cell is properly determined by the protonic conductivity, fuel barrier properties and membrane strength and a proton conducting membrane having a thickness of from 20 to 300 μm can be preferably used in general, the proton conducting membrane of the present invention, too, is produced to a thickness according to this range.

Further, at this film-forming step, a support and reinforcing material such as fiber, mat and fibril may be added to the mixture or these supports may be impregnated with the mixture. These supports and reinforcing materials to be used may be properly selected from glass materials, silicone resin materials, fluororesin materials, cyclic polyolefin materials, ultra-high molecular polyolefin materials, etc. taking into account heat resistance and acid resistance. As the impregnating method there may be used a known method such as dipping method, potting method, roll press method and vacuum press method without restriction, and heating, pressing, etc. may be further effected.

5.3 Third Step

In the method for producing a proton conducting membrane of the present invention, the third step is a step of subjecting the hydrolyzable silyl group contained in the mixture thus film-formed at the second step to hydrolysis and condensation and/or the silanol contained therein to condensation to form a film having a continuity of particles comprising a silicon-oxygen crosslinked structure.

The proton conducting membrane of the present invention is characterized in that it has a crosslinked structure formed by subjecting an alkoxysilyl group or the like to hydrolysis and condensation and thus exhibits a stable protonic conductivity and undergoes little shape change or other changes even at high temperatures. The formation of Si—O—Si bond by the hydrolysis and condensation of alkoxysilyl group, etc. is well known as sol-gel reaction.

In the sol-gel reaction, a catalyst is normally used to accelerate and control reaction. As the catalyst there is normally used an acid or base.

5.3.1 Catalyst (F)

The catalyst (F) to be used in the method for producing a proton conducting membrane of the present invention may be an acid or base.

As the acid catalyst, if used, there is used a Brønsted acid such as hydrochloric acid, sulfuric acid and acetic acid. The kind, concentration, etc. of the acid are not specifically limited, but those available may be used. Among these acid catalysts, hydrochloric acid is relatively little left behind after reaction and thus can be preferably used. In the case where hydrochloric acid is used, its concentration, etc. are not specifically limited but is normally from 0.01 to 12 N.

In general, it is known that when an acid is used, hydrolysis and condensation competes with each other to form a straight-chain crosslinked structure having little branches.

On the other hand, when a base is used as the catalyst, it is known that hydrolysis occurs at a time to form a tree-like structure having many branches. In the present invention, either method can be used taking into account the physical properties of the membrane, but a base catalyst can be preferably used to highlight the characteristic of the present invention, which is the formation of particles and a continuity thereof.

As the base catalyst there may be used an aqueous solution of sodium hydroxide, potassium hydroxide, ammonia or the like. Among these base catalysts, ammonia, which causes no production of residual salts, can be preferably used. Further, taking into account the compatibility with the mercapto group-containing compound (D), etc., organic amines can be preferably used.

Organic amines can be used without any restriction, but those having a boiling point of 50° C. or more can be preferably used, and specific examples of the organic amines having such a boiling point which are easily available include triethylamine, dipropylamine, isobutylamine, diethylamine, diethyl ethanolamine, triethanolamine, pyridine, piperadine, tetramethyl ammonium hydroxide, etc., and any of these organic amines can be preferably used.

Further, as the condensation catalyst there may be used a fluoride such as potassium fluoride, ammonium fluoride, tetramethyl ammonium fluoride and tetraethyl ammonium fluoride.

The added amount of the catalyst can be arbitrarily predetermined and is properly determined taking into account the reaction rate and the compatibility with the membrane materials.

The step of introducing the catalyst may be conducted at any time from the first to third steps. The simplest approach is to introduce the catalyst during the preparation of the mixture at the first step, but in this case, the pot life or set time during film forming at the second step needs to be taken into account.

5.3.1 Condensation Reaction

The condensation reaction can be effected even at room temperature but is preferably effected under heating to shorten the reaction time and make more efficient curing. Heating may be carried out by a known method and oven heating, autoclave heating under pressure, far infrared heating, electromagnetic induction heating, microwave heating, etc. may be used. Heating may be effected at an arbitrary temperature from room temperature to 300° C., preferably from 100 to 250° C. In this case, heating may be effected under reduced pressure or in the atmosphere of an inert gas such as nitrogen and argon.

Further, heating may be carried out by a method such that a sudden change of atmosphere can be avoided, e.g., by taking some time to cure at room temperature and then gradually raising the temperature to high value.

Further, heating may be effected in water vapor to supply water required for hydrolysis or in a solvent vapor to prevent sudden drying of the membrane.

The membrane which has been subjected to treatment at the third step may be optionally rinsed to remove unreacted matters or curing catalyst, and then deionized with sulfuric acid or the like.

5.4 Fourth Step

In the method for producing a proton conducting membrane of the present invention, the fourth step is a step of oxidizing the mercapto group in the film to a sulfonic acid group which is then introduced into the surface of the aforesaid particles.

As previously mentioned, the film may be rinsed prior to oxidation or, if an organic amine is used as a catalyst, may be brought into contact with an acid such as hydrochloric acid and sulfuric acid prior to oxidation to remove the catalyst.

Water to be used in rinse is preferably metal ion-free water such as distilled water and ion-exchanged water. Rinse may be effected under heating, pressure or oscillation for higher efficiency. Further, in order to accelerate penetration of water into the film, a solvent mixture comprising methanol, ethanol, n-propanol, i-propanol, acetone, tetrahydrofuran or the like incorporated in water may be used.

The mercapto group oxidation method to be used in the present invention is not specifically limited, but an ordinary oxidizing agent may be used. In some detail, as described in "Shin Jikken Kagaku Koza (New Institute of Experimental Chemistry)", Maruzen, 3rd edition, vol. 15, 1976, an oxidizing agent such as nitric acid, hydrogen peroxide, oxygen, organic peracid (percarboxylic acid), bromine water, hypochlorite, hyponitrite, potassium permanganate and chromic acid may be used.

Among these oxidizing agents, hydrogen peroxide and organic peracid (peracetic acid, perbenzoic acid) can be preferably used because they can be relatively easily handled and provide a good oxidation yield.

Further, in order to protonate the sulfonic acid group in the film obtained by oxidation, the sulfonic acid may be brought into contact with a strong acid such as hydrochloric acid and sulfuric acid. In this case, protonating conditions such as acid concentration, dipping time and dipping temperature are properly determined by the concentration of sulfonic acid group in the film, the porosity of the film, the affinity of the film for acid, etc. Representative examples of the protonating method include a method which comprises dipping the film in a 1 N sulfuric acid at 50° C. for 1 hour.

Further, the film thus oxidized is preferably rinsed to remove the oxidizing agent therefrom.

Further, the film thus oxidized may be subjected to acid treatment with hydrochloric acid, sulfuric acid or the like. It can be expected that when the film is subjected to acid treatment, impurities or unnecessary metal ions in the film are washed away. The film thus acid-treated is preferably rinsed again.

The producing method described above is only an example, and a method can be also conducted which comprises previously preparing silica or particulate metal oxide having a desired average particle diameter, subjecting the silica or particulate metal oxide to surface treatment with a mercapto group-containing compound (D) as a silane coupling agent, and then oxidizing the material by way of example. However, when such a surface treatment method is used, a stabilized performance can be difficultly obtained and a high concentration surface treatment can be difficultly made, and the method described in the present invention is preferably used as a method for producing a proton conducting membrane.

EXAMPLE

The present invention will be described hereinafter in connection with examples. The present invention is not limited to the following examples. As all the compounds, solvents, etc. to be used in the examples and comparative examples there were used commercially available products, and those which are not specifically described were available from Wako Pure Chemical Industries, Ltd. Further, the physical properties of the proton conducting membrane thus prepared were evaluated by the evaluation methods described below.

[Evaluation Method]

(1) Evaluation of Protonic Conductivity

The proton conducting membrane obtained by the producing method for the present invention was set in an ordinary electrochemical cell (e.g., same as described in FIG. 3 of JP-A-2002-184427) and brought into close contact with a platinum plate. To this platinum plate was connected an electrochemical impedance measuring device (Type 1260, produced by Solartron Inc.), and the proton conducting membrane was then measured for impedance at a frequency of from 0.1 Hz to 100 kHz to evaluate the protonic conductivity thereof.

In the aforementioned measurement, the sample was supported an electrically insulating sealed vessel and measured for protonic conductivity in a water vapor atmosphere (95 to 100% RH) at various cell temperatures ranging from room temperature to 160° C. which were varied by a temperature controller. In the examples and comparative examples of the present invention, measurements at 80° C. and 120° C. were indicated as representative values. In the measurement at 100° C. or more, the interior of the measurement tank was pressed.

(2) Evaluation of Water Content and Percent Swelling

The proton conducting membrane obtained in the producing method for the present invention was allowed to stand and dry in an oven which had been operated at 120° C. for 2 hours, and then measured for weight to determine dried weight. Further, the membrane thus obtained was measured for size to determine dried length (diameter was measured because the membrane was obtained mainly in circular form). Thereafter, the membrane was dipped in 80° C. water, wiped to remove water from the surface thereof, and then again measured for weight, and the weight rise was then divided by the dried weight to determine water content. At this time, the size of the membrane was measured, and the length change was then divided by the dried length to determine percent swelling.

(3) Evaluation of Particle Structure

The membrane thus obtained was observed under electron microscope (electron microscope: Type S-4100 electric field radiating scanning electron microscope, produced by Hitachi Chemical Co., Ltd.) to estimate the presence of a continuity of particles and the particle diameter.

Those having a continuity of particles were judged o, those having no continuity of particles were judged X and the particle diameter was represented by estimated average value.

Example 1

First step: 0.2 g of 3-mercaptopropyltrimethoxysilane (trade name "SILA-ACE S-810", produced by Shin-Etsu Chemical Co., Ltd.), 0.8 g of tetraethoxysilane, 0.2 g of diethylene glycol, 0.6 g of triethylamine and 0.25 g of water were dissolved in 1.8 mL of tetrahydrofurane, and the mixture was then vigorously stirred at room temperature for 10 minutes. Second step: The mixture obtained at the first step was poured into a petri dish comprising Teflon (registered trade name) having an inner diameter of 9.0 cm (produced by Flonchemical Co., Ltd.), and the petri dish was then covered by a glass sheet. Third step: The film-like material prepared at the second step was allowed to stand at room temperature for 3 days so that it was gelated. The film thus gelated was heated in a desiccator containing water in a 80° C. oven for 12 hours and then in a 120° C. oven for 24 hours. The film-like material thus obtained was withdrawn, and then dipped in water for 1 hour, a 1N sulfuric acid for 1 hour and then water for 1 hour to extract unreacted materials, catalyst and polarity controller therefrom. Fourth step: The film obtained at the third step was dipped in peracetic acid prepared by mixing 125 mL of acetic acid and 100 ml of a 30% aqueous hydrogen peroxide, and then heated to 80° C. for 1 hour. The film thus obtained was withdrawn from the peracetic acid solution, and then dipped in 80° C. water for 1 hour three times to thoroughly extract the peracetic solution. A film having some turbidity was obtained. The film was a circle having a diameter of about 4 cm and had a thickness of 200 μm.

Example 2

A film was obtained in the same manner as in Example 1 except that at the first step 0.05 g of a 3% methanol solution of potassium fluoride was further added as another catalyst and a polyethylene glycol #200 (average molecular weight: 200) was used instead of diethylene glycol.

Example 3

A film was obtained in the same manner as in Example 1 except that at the first step tetramethoxysilane was used in stead of tetraethoxysilane, 1,8-bis (triethoxysilyl)octane (produced by Gelest, Inc.) was used as a crosslinking agent, 0.05 g of a 3% methanol solution of potassium fluoride was further added as another catalyst and triethylene glycol was used instead of diethylene glycol and the heating temperature at the third step was 150° C.

Example 4

A film was obtained in the same manner as in Example 1 except that at the first step 1.0 g of a copolymer of 3-mercapto propyltrimethoxysilane with tetraethoxysilane (product number "X41-1805", produced by Shin-Etsu Chemical Co., Ltd.) was used in stead of 3-mercaptopropyltrimethoxysilane, tetraethoxysilane was not used, a polyethylene glycol #300 (produced by Nacalai Tesque Co., Ltd.) was used instead of diethylene glycol and pyridine was used instead of triethylamine and the heating temperature at the third step was 150° C.

Example 5

A film was obtained in the same manner as in Example 1 except that at the first step 0.8 g of a copolymer of 3-mercaptopropyltrimethoxysilane with tetraethoxysilane (product number "X41-1805", produced by Shin-Etsu Chemical Co., Ltd.) was used in stead of 3-mercaptopropyltrimethoxysilane, 0.2 g of tetraethoxysilane was used, a 1:4 mixture of glycerin and a polyethylene glycol #400 (produced by Nacalai Tesque Co., Ltd.) was used instead of diethylene glycol and 0.3 g of an aqueous ammonia (25%) was used instead of triethylamine.

Example 6

A film was obtained in the same manner as in Example 1 except that at the first step 0.8 g of a copolymer of 3-mercaptopropyltrimethoxysilane with tetraethoxysilane (product number "X41-1805", produced by Shin-Etsu Chemical Co., Ltd.) was used in stead of 3-mercaptopropyltrimethoxysilane, 0.1 g of tetraethoxy silane was used as a crosslinking agent, 0.1 g of 1,8-bis(diethoxymethylsilyl)octane was further used as a crosslinking agent, a polyethylene glycol #200 was used instead of diethylene glycol, triethanolamine was used instead of triethylamine and 0.05 g of a 3% methanol solution of potassium fluoride was added as another catalyst.

Example 7

A film was obtained in the same manner as in Example 1 except that at the first step 0.8 g of a copolymer of 3-mercaptopropyltrimethoxysilane with tetraethoxysilane (product number "X41-1805", produced by Shin-Etsu Chemical Co., Ltd.) was used in stead of 3-mercaptopropyltrimethoxysilane, 0.2 g of tetraethoxy silane was used as a crosslinking agent, a polyethylene glycol #200 was used instead of diethylene glycol, tetramethylammonium hydroxide was used instead of triethylamine and 0.05 g of a 3% methanol solution of ammonium fluoride was added as another catalyst and the heating at the third step was effected at 200° C. in a nitrogen atmosphere.

Example 8

A film was obtained in the same manner as in Example 1 except that at the first step 0.8 g of a copolymer of 3-mercaptopropyltrimethoxysilane with tetraethoxysilane (product number "X41-1805", produced by Shin-Etsu Chemical Co., Ltd.) was used in stead of 3-mercaptopropyltrimethoxysilane, 0.2 g of methyltriethoxysilane was used as a crosslinking agent instead of tetraethoxysilane, a polyethylene glycol #200 was used instead of diethylene glycol and 0.05 g of a 3% methanol solution of potassium fluoride was added as another catalyst and the heating at the third step was effected at 200° C. in a nitrogen atmosphere.

Example 9

(Synthesis of Mercapto Group-Containing Condensation Product (I))

2.8 g of 3-mercaptopropyltrimethoxysilane and 9.2 g of tetramethoxysilane were dissolved in 3.5 g of methanol to which 0.9 g of a 0.1N hydrochloric acid was then added, and the mixture was then stirred at room temperature for 3 hours. Further, to the solution was added 0.7 g of a 1% methanol solution of potassium fluoride, and the mixture was then stirred over a 70° C. hot plate for 3 hours. The solution thus obtained was concentrated under reduced pressure as it was to obtain a mercapto group-containing condensation product (I-1) in the form of viscous liquid. The mercapto group-containing condensation product (I-1) had a polymerization degree of 19 and exhibited a mercapto group-containing compound to hydrolyzable silyl compound ratio of 1:4, which is almost the same as the molar ratio of the two compounds injected, as calculated in terms of Si-nuclear magnetic resonance spectrum.

(Formation of Film)

A film was obtained in the same manner as in Example 1 except that at the first step 0.8 g of the mercapto group-containing condensation product (I-1) synthesized above was used in stead of 3-mercaptopropyl trimethoxysilane, 0.2 g of tetraethoxysilane was used as a crosslinking agent a polyethylene glycol #200 was used instead of diethylene glycol and 0.05 g of a 3% methanol solution of potassium fluoride was added as another catalyst and the heating at the third step was effected at 200° C. in a nitrogen atmosphere.

Example 10

(Synthesis of Mercapto Group-Containing Condensation Product (I))

A mercapto group-containing condensation product (1-2) was obtained in the same manner as in Example 9 except that 10.6 g of methyl triethoxysilane was used instead of tetramethoxysilane.

(Formation of Film)

A film was obtained in the same manner as in Example 9 except that at the first step 0.8 g of the mercapto group-containing condensation product (1-2) synthesized above was used in stead of 3-mercaptopropyl trimethoxysilane.

Example 11

(Synthesis of Mercapto Group-Containing Condensation Product (I))

A mercapto group-containing condensation product (I-3) was obtained in the same manner as in Example 9 except that 2.7 g of 3-mercaptopropylmethyldimethoxysilane (Gelest, Inc.) was used instead of 3-mercaptopropyltrimethoxysilane.

(Formation of film)

A film was obtained in the same manner as in Example 9 except that at the first step 0.8 g of the mercapto group-containing condensation product (I-3) synthesized above was used in stead of 3-mercaptopropyl trimethoxysilane.

Example 12

(Synthesis of Mercapto Group-Containing Condensation Product (H))

11.1 g of 3-mercaptopropyltrimethoxysilane was dissolved in 6.0 g of methanol to which 1.4 g of a 4N hydrochloric acid (prepared from a product of Wako Pure Chemical Industries, Ltd.) was then added, and the mixture was then stirred over a 70° C. hot plate for 3 hours. When a cloudy liquid thus obtained was allowed to stand at room temperature, it was then divided into two layers. The upper layer (solvent, hydrochloric acid, unreacted materials) was removed, and the oligomer as lower layer was then washed twice with methanol. 8.0 g of a mercapto group-containing condensation product (H-1) was obtained.

The molecular weight of the mercapto group-containing condensation product (H-1) was measured by GPC (type 8020, produced by TOSOH CORPORATION), and the polymerization degree thereof was found to be 7.5 (molecular weight Mw in styrene equivalence=approx. 2,000).

(Formation of Film)

A film was obtained in the same manner as in Example 9 except that at the first step 0.6 g of the mercapto group-containing condensation product (I-3) synthesized above and 0.6 g of tetraethoxysilane were used in stead of 3-mercaptopropyl trimethoxysilane.

Comparative Example 1

A film was obtained in the same manner as in Example 9 except that the polyethylene glycol #200, which is a polarity controller (E), was not used.

Comparative Example 2

Nafion 112 (registered trade name), which is a proton conducting membrane commercially available from Du Pont Inc., was washed with a 30% aqueous hydrogen peroxide, a 1N sulfuric acid and water before use.

Example 13

In Example 9, the mixture obtained at the first step was casted over a Teflon (registered trade name) sheet at the second step, a porous fluororesin membrane (Membrane Filter JG, produced by Millipore Corporation) was disposed on the casted material, a Teflon (registered trade name) sheet was disposed on the laminate, and the laminate was then subjected to impregnation by roll press method. The impregnated amount was adjusted to 50 g/m$^2$.

The subsequent processes were conducted in the same manner as in Example 9 to obtain a proton conducting membrane.

Figure 3:
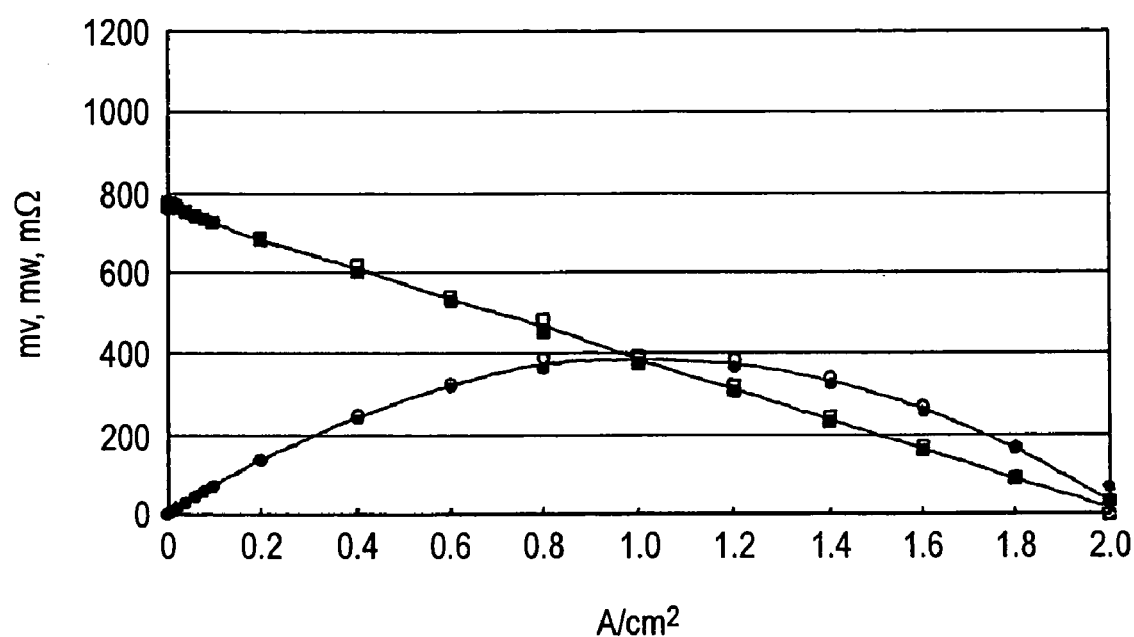
FIG. 3 is a diagram illustrating a voltage-current curve of a fuel cell formed by a proton conducting membrane of an example of the present invention.

The membrane thus obtained was clamped between gas diffusion electrodes (loaded with 0.5 mg of platinum, produced by E-TEK Corporation) which were then introduced in a single cell (membrane area: 5.25 cm$^2$, produced by Electrochem Inc.). The voltage-current curve obtained at 80° C. by introducing hydrogen and oxygen into the anode and cathode thereof, respectively, and connecting an electronic load to the output thereof is shown in FIG. 3.

The general formulation of the examples and comparative examples are set forth in Tables 1 and 2 and the results of evaluation are set forth in Table 3.

TABLE 1

| | Mercapto group-containing compound (D) | Crosslinking agent (J) | Crosslinking agent (K) | Polarity controller (E) | Catalyst (F) | Reaction conditions | Remarks |
|---|---|---|---|---|---|---|---|
| Example 1 | 3-Mercaptopropyl trimethoxysilane | Tetraethoxysilane | — | Diethylene glycol | Triethyl amine | 120° C. 24 hrs. | |
| Example 2 | 3-Mercaptopropyl trimethoxysilane | Tetraethoxysilane | — | Polyethylene glycol #200 | Triethyl amine potassium fluoride | 120° C. 24 hrs. | |
| Example 3 | 3-Mercaptopropyl trimethoxysilane | Tetramethoxysilane | 1,8-Bis (triethoxysilyl) octane | Triethylene glycol | Triethyl amine potassium fluoride | 150° C. 24 hrs. | |
| Example 4 | 3-Mercaptopropyl trimethoxysilane-tetraethoxysilane cocondensation product | — | — | Polyethylene glycol #300 | Pyridine | 150° C. 24 hrs. | |

TABLE 1-continued

| | Mercapto group-containing compound (D) | Crosslinking agent (J) | Crosslinking agent (K) | Polarity controller (E) | Catalyst (F) | Reaction conditions | Remarks |
|---|---|---|---|---|---|---|---|
| Example 5 | 3-Mercaptopropyl trimethoxysilane-tetraethoxysilane cocondensation product | Tetraethoxysilane | — | Glycerin + Polyethylene glycol #400 | Ammonia (25% aqueous solution) | 120° C. 24 hrs. | |
| Example 6 | 3-Mercaptopropyl trimethoxysilane-tetraethoxysilane cocondensation product | Tetraethoxysilane | 1,8-Bis(methyl diethoxysilyl) octane | Polyethylene glycol #200 | Triethanol amine potassium fluoride | 120° C. 24 hrs. | |
| Example 7 | 3-Mercaptopropyl trimethoxysilane-tetraethoxysilane cocondensation product | Tetraethoxysilane | — | Polyethylene glycol #200 | Tetramethyl ammonium hydroxide ammonium fluoride | 200° C. 3 hrs. (in nitrogen atmosphere) | |
| Example 8 | 3-Mercaptopropyl trimethoxysilane-tetraethoxysilane cocondensation product | Methyl triethoxy silane | — | Polyethylene glycol #200 | Triethyl amine potassium fluoride | 200° C. 3 hrs. (in nitrogen atmosphere) | |
| Example 9 | 3-Mercaptopropyl trimethoxysilane-tetramethoxysilane cocondensation product | Tetraethoxysilane | — | Polyethylene glycol #200 | Triethyl amine potassium fluoride | 200° C. 3 hrs. (in nitrogen atmosphere) | |

TABLE 2

| | Mercapto group-containing compound (D) | Crosslinking agent (J) | Crosslinking agent (K) | Polarity controller (E) | Catalyst (F) | Reaction conditions | Remarks |
|---|---|---|---|---|---|---|---|
| Example 10 | 3-Mercaptopropyl trimethoxysilane-methyltriethoxy silane cocondensation product | Tetraethoxysilane | — | Polyethylene glycol #200 | Triethyl amine potassium fluoride | 200° C. 3 hrs. (in nitrogen atmosphere) | |
| Example 11 | 3-Mercaptopropyl methyldimethoxy silane-tetraethoxy silane cocondensation product | Tetraethoxysilane | — | Polyethylene glycol #200 | Triethyl amine potassium fluoride | 200° C. 3 hrs. (in nitrogen atmosphere) | |
| Example 12 | 3-Mercaptopropyl trimethoxysilane condensation product | Tetraethoxysilane | — | Polyethylene glycol #200 | Triethyl amine potassium fluoride | 200° C. 3 hrs. (in nitrogen atmosphere) | |
| Example 13 | 3-Mercaptopropyl trimethoxysilane-tetramethoxy silane cocondensation product | Tetraethoxysilane | — | Polyethylene glycol #200 | Triethyl amine potassium fluoride | 200° C. 3 hrs. (in nitrogen atmosphere) | Porous Teflon sheet impregnated |
| Comparative Example 1 | 3-Mercaptopropyl trimethoxysilane-tetraethoxysilane cocondensation product | Tetraethoxysilane | — | — | Triethyl amine potassium fluoride | 200° C. 3 hrs. (in nitrogen atmosphere) | Same as in Example 9 except that the polarity controller (E) was omitted |
| Comparative Example 2 | A commercially available proton conducting membrane (Nafion 112, produced by Du Pont Inc.) was used as it was. | | | | | | |

TABLE 3

| | Proton conductivity (S/cm) | | Water content (%) | Percent swelling (%) | Presence of particulate structure | Average particle diameter (nm) |
|---|---|---|---|---|---|---|
| | 80° C./95% RH | 120° C./100% RH | | | | |
| Example 1 | 8.9 × 10⁻¹ | 1.0 × 10⁻¹ | 25.3 | 1.9 | ◯ | 15 |
| Example 2 | 1.2 × 10⁻¹ | 1.5 × 10⁻¹ | 22.8 | 1.3 | ◯ | 15 |
| Example 3 | 1.1 × 10⁻¹ | 1.6 × 10⁻¹ | 20.9 | 1.1 | ◯ | 20 |
| Example 4 | 1.5 × 10⁻¹ | 1.9 × 10⁻¹ | 24.9 | 1.5 | ◯ | 40 |
| Example 5 | 1.2 × 10⁻¹ | 1.4 × 10⁻¹ | 25.8 | 1.5 | ◯ | 45 |
| Example 6 | 6.7 × 10⁻² | 9.2 × 10⁻² | 15.7 | 1.8 | ◯ | 35 |
| Example 7 | 1.9 × 10⁻¹ | 2.5 × 10⁻¹ | 19.5 | 0.8 | ◯ | 35 |
| Example 8 | 8.7 × 10⁻² | 9.5 × 10⁻² | 15.9 | 1.1 | ◯ | 20 |
| Example 9 | 1.8 × 10⁻¹ | 2.2 × 10⁻¹ | 11.8 | 0.5 | ◯ | 20 |
| Example 10 | 8.1 × 10⁻² | 1.5 × 10⁻¹ | 12.1 | 1.1 | ◯ | 35 |
| Example 11 | 8.8 × 10⁻² | 1.1 × 10⁻¹ | 13.2 | 0.9 | ◯ | 35 |
| Example 12 | 7.9 × 10⁻² | 9.8 × 10⁻² | 28.4 | 2.2 | ◯ | 45 |
| Example 13 | 4.2 × 10⁻² | 5.6 × 10⁻² | 12.3 | 0.0 | ◯ | 15 |

TABLE 3-continued

| | Proton conductivity (S/cm) | | Water content (%) | Percent swelling (%) | Presence of particulate structure | Average particle diameter (nm) |
|---|---|---|---|---|---|---|
| | 80° C./95% RH | 120° C./100% RH | | | | |
| Comparative Example 1 | $2.7 \times 10^{-4}$ | $5.5 \times 10^{-4}$ | 4.0 | 0.0 | X (indefinite) | Indefinite |
| Comparative Example 2 | $1.1 \times 10^{-1}$ | $1.7 \times 10^{-1}$ (tends to fall) | 14.5 | 8.7 | X | — |

As can be seen in Examples 1 to 12 in Table 2, when a continuity of particles produced by the effect of the polarity controller (E) and a proton conducting channel utilizing the gap therebetween are formed, a proton conducting membrane having a high conductivity was obtained in all these examples.

These proton conducting membranes exhibit a protonic conductivity which is equal to or greater than that of a conventional product (Comparative Example 2) and a stable protonic conductivity particularly at high temperatures and shows no change of external appearance. The membrane of Comparative Example 2 exhibits a good conductivity even at high temperatures but becomes swollen at 120° C. and is degenerated to a slightly hard membrane when returned to room temperature, demonstrating that the proton conducting membrane of the present invention is superior to the conventional membrane in high temperature durability.

On the other hand, in the case where the polarity controller (E) is not used (Comparative Example 1), a continuity of particles is not definitely formed, but an unevenness comprising particles fused to each other is merely observed and the protonic conductivity is not high. It is made obvious from this fact that the formation of a continuity of particles using the polarity controller (E) means a great improvement of performance.

Further, since little swelling/shrinkage is observed as compared with the commercially available proton conducting membrane of Comparative Example 2, the present invention is extremely favorable for the preparation of MEA.

Moreover, the complexing with a porous fluororesin membrane or the like can be made (Example 13) to form a flexible membrane without deteriorating the conductivity or heat resistance. The complex with a porous fluororesin membrane exhibited a good electricity-generating performance as well.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2003-169848, filed on Jun. 13, 2003, and its content is hereby incorporated by reference.

INDUSTRIAL APPLICABILITY

As has been described, the proton conducting membrane of the present invention has a high conductivity, an excellent dimensional stability, performs stably even at high temperatures and can raise the operating temperature of a polymer solid electrolyte type fuel cell, which has been recently noted, to 100° C. or more, and as a result, the enhancement of electricity-generating efficiency, the enhancement of cooling efficiency, the enhancement of total efficiency by the use of waste heat and the elimination of CO poisoning of catalyst can be attained.

The use of this proton conducting membrane makes it possible to provide a solid polymer type fuel cell which can cope with high temperature operation or direct fuel (e.g., methanol) supply.

The invention claimed is:

1. A proton conducting membrane comprising a crosslinked structure comprising a metal-oxygen bond, wherein the crosslinked structure comprises a continuity of particles and the particles are provided with an acid group on the surface thereof and have a proton conducting channel formed in a gap between the particles.

2. The proton conducting membrane as described in claim 1, wherein the gap between particles is communicated from the main surface to the opposite surface of the proton conducting membrane to form a proton conducting channel.

3. The proton conducting membrane as described in claim 1, wherein the metal-oxygen bond includes a silicon-oxygen bond.

4. The proton conducting membrane as described in claim 1, wherein the acid group is a sulfonic acid group.

5. The proton conducting membrane as described in claim 1, wherein the average particle diameter of the particles is from 3 to 200 nm.

6. The proton conducting membrane as described in claim 1, wherein the proton conducting membrane has a gap portion capable of containing water of from 3% to 50% by weight based on dried weight.

7. The proton conducting membrane as described in claim 1, wherein the proton conducting membrane exhibits a primary expansion coefficient ((length of water-moistened membrane−length of dried membrane)/length of dried membrane) of 3% or less when moistened with water and dried.

8. The proton conducting membrane as described in claim 1, wherein the particles have an acid group-containing structure (A) represented by the following formula (1):

(1)

wherein X represents —O— bond taking part in crosslinking or OH group; $R^1$ represents a hydrocarbon group having 20 or less carbons; $R^2$ represents any of $CH_3$, $C_2H_5$, $C_3H_7$ and $C_6H_5$; and n represents an integer of from 1 to 3, with the proviso that when n is 1, $R^2$ may be a mixture of different substituents.

9. The proton conducting membrane as described in claim 8, wherein the particles have a three-dimensional crosslinked structure comprising a silicon-oxygen bond and a structure represented by the formula (1) and the silicon atoms having the structure represented by the formula (1) account for 3% or more of all the silicon atoms in the particles.

10. The proton conducting membrane as described in claim 8, wherein $R^1$ in the formula (1) is a saturated alkylene group represented by the following formula (2):

wherein n represents an integer of from 1 to 30.

11. The proton conducting membrane as described in claim 1, wherein the particles have a crosslinked structure (B) represented by the following formula (3):

wherein $R^3$ represents an alkyl group having 20 or less carbon atoms; X represents —O— bond taking part in crosslinking or OH group; and n represents an integer of from 2 to 4.

12. The proton conducting membrane as described in claim 1, wherein the particles have a bridged crosslinked structure (C) represented by the following formula (4):

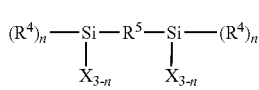

wherein X represents —O— bond taking part in crosslinking or OH group; $R^5$ represents a molecular chain group having 1 to 30 carbon atoms; $R^4$ represents a group selected from the group consisting of $CH_3$, $C_2H_5$, $C_3H_7$, $C_4H_9$ or $C_6H_5$; and n represents an integer of 0, 1 or 2.

13. The proton conducting membrane as described in claim 1, which is produced by:
a first step of preparing a mixture comprising a mercapto group-containing compound (D) having a mercapto group and a condensation-reacting hydrolyzable silyl group covalently bonded to the mercapto group and/or silanol group and a polarity controller (E);
a second step of film-forming the mixture into a substrate;
a third step of subjecting the hydrolyzable silyl group contained in the mixture thus film-formed to hydrolysis and condensation and/or the silanol contained therein to condensation to form a film having a continuity of particles comprising a silicon-oxygen crosslinked structure; and
a fourth step of oxidizing the mercapto group in the film to a sulfonic acid group which is then introduced into the surface of the particles.

14. A method for producing a proton conducting membrane comprising:
a first step of preparing a mixture comprising a mercapto group-containing compound (D) having a mercapto group and a condensation-reacting hydrolyzable silyl group covalently bonded to the mercapto group and/or silanol group and a polarity controller (E);
a second step of film-forming the mixture into a substrate;
a third step of subjecting the hydrolyzable silyl group contained in the mixture thus film-formed to hydrolysis and condensation and/or the silanol contained therein to condensation to form a film having a continuity of particles with gaps therebetween comprising a silicon-oxygen crosslinked structure comprising a silicon-oxygen bond; and
a fourth step of oxidizing the mercapto group in the film to a sulfonic acid group which is then introduced into the surface of the particles.

15. The method for producing a proton conducting membrane as described in claim 14, wherein a catalyst (F) is used at the third step.

16. The method for producing a proton conducting membrane as described in claim 15, wherein the catalyst (F) is a basic catalyst which is at least one compound selected from amines or ammonium salts.

17. The method for producing a proton conducting membrane as described in claim 16, wherein the catalyst (F) is at least one compound selected from the group consisting of ammonia, triethylamine, dipropylamine, isobutylamine, diethylamine, diethyl ethanolamine, triethanolamine, pyridine, piperadine and tetramethyl ammonium hydroxide.

18. The method for producing a proton conducting membrane as described in claim 14, wherein the polarity controller (E) is an organic compound having a boiling point of 100° C. or more and a melting point of 25° C. or more.

19. The method for producing a proton conducting membrane as described in claim 14, wherein the polarity controller (E) has a structure represented by the following formula (5):

wherein n represents an integer of from 1 to 14.

20. The method for producing a proton conducting membrane as described in claim 14, wherein the mercapto group-containing compound (D) is a mercapto group-containing compound (G) represented by the following formula (6):

wherein $R^7$ represents any of H, $CH_3$, $C_2H_7$, $C_3H_6$ and $C_4H_9$; $R^1$ represents a hydrocarbon group having 20 or less carbon atoms; $R^2$ represents any of $CH_3$, $C_2H_5$, $C_3H_7$ and $C_6H_5$; and n represents an integer of from 1 to 3, with the proviso that when n is 1, $R^2$ may be a mixture of different substituents.

21. The method for producing a proton conducting membrane as described in claim 14, wherein the mercapto group-containing compound (D) is a mercapto group-containing condensation product (H) represented by the following formula (7):

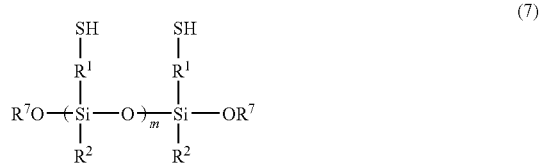

wherein $R^7$ represents any of H, $CH_3$, $C_2H_5$, $C_3H_6$ and $C_4H_9$; $R^1$ represents a hydrocarbon group having 20 or less carbon atoms; $R^2$ represents any of OH, $OCH_3$, $OC_2H_5$, $OC_3H_6$, $OC_4H_9$, $CH_3$, $C_2H_5$, $C_3H_7$, $C_4H_9$ and $C_6H_5$; m represents an integer of from 1 to 100; and the mercapto group-containing condensation product may be an annular structure or branched structure wherein $R^7$ forms —Si bond or $R^2$ forms O—Si bond.

22. The method for producing a proton conducting membrane as described in claim 14, wherein the mercapto group-containing compound (D) is a mercapto group-containing condensation product (I) represented by the following formula (8):

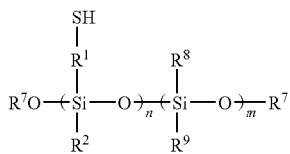

(8)

wherein $R^7$ represents any of H, $CH_3$, $C_2H_5$, $C_3H_6$ and $C_4H_9$; $R^1$ represents a hydrocarbon group having 20 or less carbon atoms; $R^2$, $R^8$ and $R^9$ each independently represent any of OH, $OCH_3$, $OC_2H_5$, $OC_3H_6$, $OC_4H_9$, $CH_3$, $C_2H_5$, $C_3H_7$, $C_4H_9$ and $C_6H_5$; n and m each independently represent an integer of from 1 to 100; and the mercapto group-containing condensation product may be an annular structure or branched structure wherein $R^7$ forms —Si bond or $R^2$, $R^8$ and $R^9$ each forms —O—Si bond.

23. The method for producing a proton conducting membrane as described in any one of claims 20 to 22, wherein $R^1$ in the formulae (6) to (8) is a structure represented by the following formula (9):

$$-(CH_2)_s- \qquad (9)$$

wherein s represents an integer of from 1 to 20.

24. The method for producing a proton conducting membrane as described in claim 14, wherein the mixture prepared at the first step comprises a crosslinking agent (J) represented by the following formula (10):

$$Si(R^{10})_n(R^3)_{4-n} \qquad (10)$$

wherein $R^3$ represents an alkyl group having 20 or less carbon atoms; $R^{10}$ represents OH, $OCH_3$, $OC_2H_5$, $OC_3H_6$, $OC_4H_9$, $OCOCH_3$ or Cl; and n represents an integer of from 2 to 4.

25. The method for producing a proton conducting membrane as described in claim 14, wherein the mixture prepared at the first step comprises a bridging/ crosslinking agent (K) represented by the following formula (11):

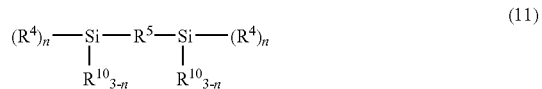

wherein $R^{10}$ represents OH, $OCH_3$, $OC_2H_5$, $OC_3H_6$, $OC_4H_9$, $OCOCH_3$ or Cl; $R^5$ represents a $C_1$—$C_{30}$ carbon group-containing molecular chain group; $R^4$ represents any group selected from $CH_3$, $C_2H_5$, $C_3H_7$, $C_4H_9$ and $C_6H_5$; and n represents an integer of from 0, 1 or 2.

26. The method for producing a proton conducting membrane as described in any one of claims 15 to 17, wherein at the third step, at least one compound selected from potassium fluoride, ammonium fluoride, tetramethylammonium fluoride and tetraethylammonium fluoride is used in combination as the catalyst (F).

27. A fuel cell prepared using any of a proton conducting membrane as described in claim 1 and a method for producing a proton conducting membrane as described in claim 14.

* * * * *